(12) United States Patent
Craymer, III

(10) Patent No.: US 11,262,988 B2
(45) Date of Patent: Mar. 1, 2022

(54) METHOD AND SYSTEM FOR USING SUBROUTINE GRAPHS FOR FORMAL LANGUAGE PROCESSING

(71) Applicant: Loring G. Craymer, III, Temple City, CA (US)

(72) Inventor: Loring G. Craymer, III, Temple City, CA (US)

(*) Notice: Subject to any disclaimer, the term of this patent is extended or adjusted under 35 U.S.C. 154(b) by 0 days.

(21) Appl. No.: 17/111,256

(22) Filed: Dec. 3, 2020

(65) Prior Publication Data

US 2021/0089284 A1 Mar. 25, 2021

Related U.S. Application Data

(63) Continuation of application No. 16/790,896, filed on Feb. 14, 2020, now Pat. No. 10,891,117.

(60) Provisional application No. 62/807,704, filed on Feb. 19, 2019.

(51) Int. Cl.
*G06F 9/44* (2018.01)
*G06F 8/41* (2018.01)

(52) U.S. Cl.
CPC .................. *G06F 8/425* (2013.01)

(58) Field of Classification Search
CPC ...................................... G06F 8/425
USPC ......................................... 717/157
See application file for complete search history.

(56) References Cited

U.S. PATENT DOCUMENTS

| 2007/0022414 | A1 | 1/2007 | Bird | |
|---|---|---|---|---|
| 2015/0363294 | A1* | 12/2015 | Carback, III | ............ G06F 8/37 717/132 |
| 2016/0012033 | A1 | 1/2016 | Craymer, III | |
| 2019/0243621 | A1 | 8/2019 | Gass et al. | |

FOREIGN PATENT DOCUMENTS

| EP | 0214751 B1 | 6/1994 |
|---|---|---|
| KR | 10-2010-0050460 A | 5/2010 |

OTHER PUBLICATIONS

International Search Report & Written Opinion, International App. No. PCT/IB2020/051225, dated May 22, 2020, pp. 1-10.
Notice of Allowance, U.S. Appl. No. 16/790,896, dated Sep. 3, 2020, 9 pages.
(Continued)

*Primary Examiner* — Chuck O Kendall
(74) *Attorney, Agent, or Firm* — Nicholson, De Vos, Webster & Elliott, LLP

(57) ABSTRACT

A method to process subroutine-structured graph-based intermediate representations during formal language processing implemented by a computing device. The method includes classifying a set of subroutines identified in an intermediate representation of code according to mutually recursive relationships between subroutines in the set of subroutines, recording the mutually recursive relationships, labeling to track the mutually recursive relationships, constructing a set of graph representations, collecting partial positions that distinguish points of action in generated code, labeling nodes of the graph of the intermediate representation, generating a subsequent intermediate representation by serialization of the graph of the intermediate representation through pre-order depth-first traversal, and creating the generated code from the intermediate representation.

21 Claims, 23 Drawing Sheets

(56) References Cited

OTHER PUBLICATIONS

Oliveira, et al., "Abstract Syntax Graphs for Domain Specific Languages," PEPM '13: Proceedings of the ACM SIGPLAN 2013, Jan. 21-22, 2013, 10 pages.

Rohloff, Judith, "Analysis and implementation of hierarchical mutually recursive first-class modules," Doctoral Thesis, Berlin Institute of Technology, Available Online at <https://depositonce.tu-berlin.de/handle/11303/5048>, Oct. 16, 2015, 110 pages.

* cited by examiner (1)

(2)

Convert partial positions to linked paths
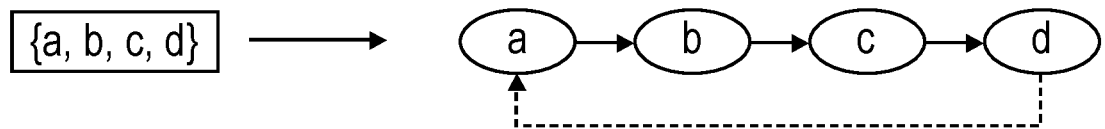
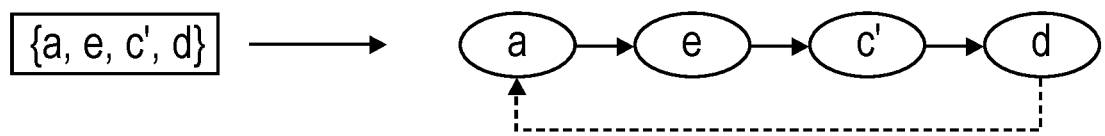
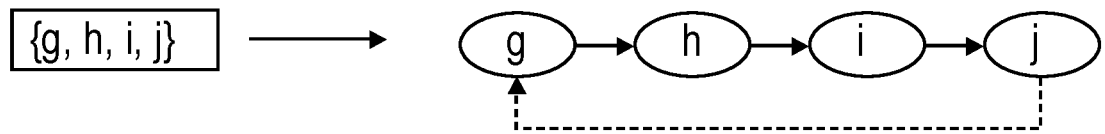
FIG. 12A
Resulting graph
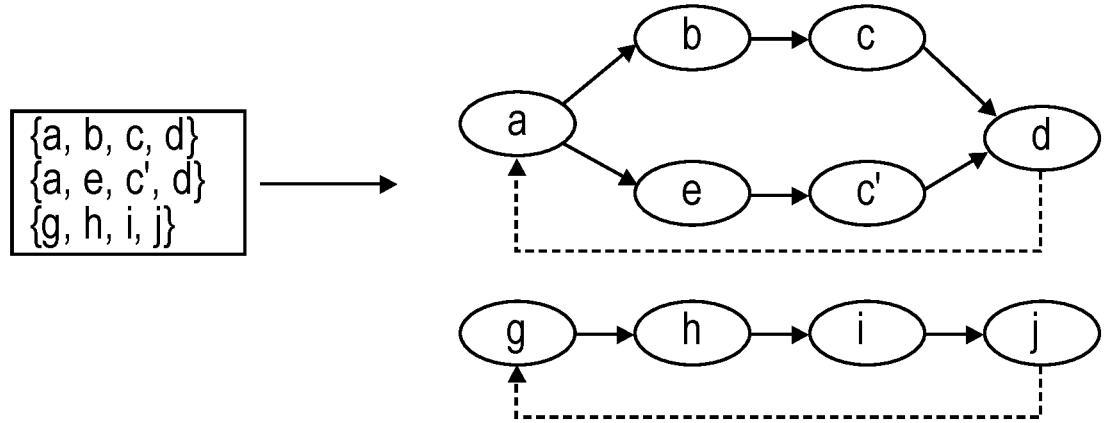
FIG. 12B

```
switch (ruleState) {
    case STATE_element0:
        ruleState = STATE_elementItem0;
        break;
    case STATE_element1:
        ruleState = STATE_elementItem2;
        break;
    case STATE_element2:
        ruleState = STATE_elementItem4;
        break;
    case STATE_element3:
        ruleState = STATE_elementItem6;
        break;
}
```

FIG. 13A

```
switch (ruleState) {
    case STATE_simplexTerm1:
    case STATE_simplexTerm6:
    case STATE_simplexTerm11:
    case STATE_simplexTerm16:
        if (_type == OPEN_ELEMENT_OPTION) {
            altSelect = 0;
            indexTrack.add(altSelect);
        }
        else if (set42.data.contains(_type)) {
            altSelect = 1;
            indexTrack.add(altSelect);
        }
        break;
    case STATE_simplexTerm21:
    case STATE_simplexTerm26:
        if (_type == OPEN_ELEMENT_OPTION) {
            altSelect = 0;
            indexTrack.add(altSelect);
        }
        break;
    default:
        altSelect = -1;
}
```

FIG. 13B

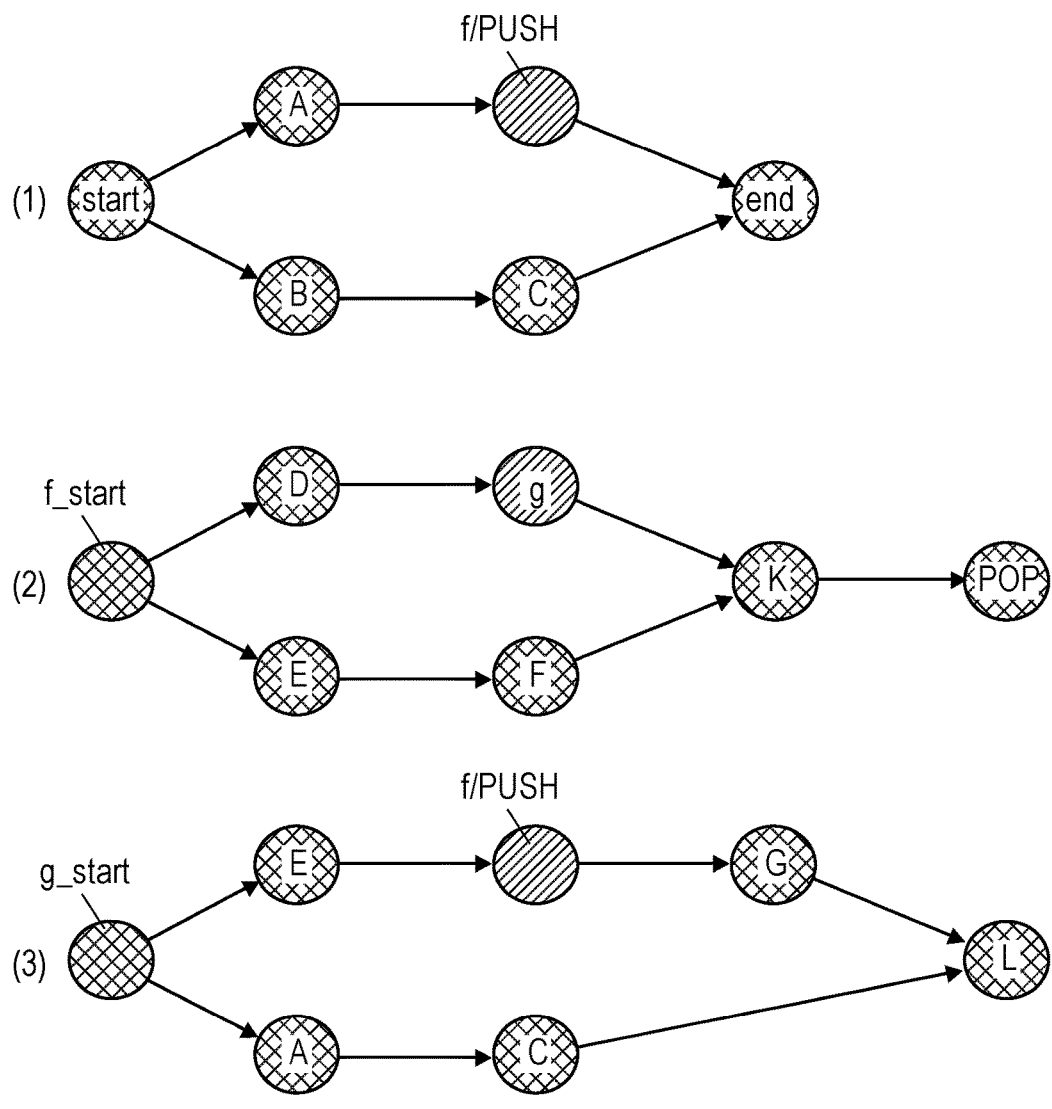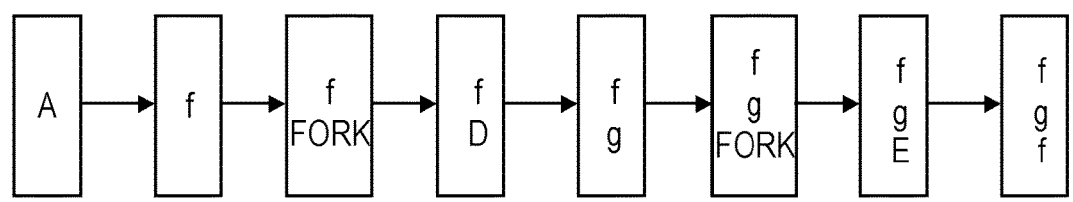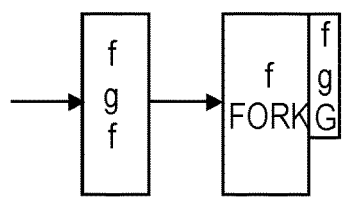
FIG. 18

METHOD AND SYSTEM FOR USING SUBROUTINE GRAPHS FOR FORMAL LANGUAGE PROCESSING

CROSS-REFERENCE TO RELATED APPLICATIONS

This application is a continuation of U.S. application Ser. No. 16/790,896, filed Feb. 14, 2020 (now U.S. Pat. No. 10,891,117, issued Jan. 12, 2021), which claims the benefit of U.S. Provisional Application No. 62/807,704, filed Feb. 19, 2019, which are hereby incorporated by reference.

TECHNICAL FIELD

The embodiments of the invention as illustrated and described herein are related to formal language processing. Specifically, the embodiments provide an improved process for managing an intermediate representation of a formal language source file using subroutine graphs.

BACKGROUND

Formal language translation is a process of transforming a source language into a target language. Formal language translation involves parsing, construction of data structures that capture language features in forms that favor analytical processing, transformation of data structures into other data structures suited to further processing and generating the target code. This process was developed from the understanding that parsing (syntactic analysis) could be formalized, automated, and input could be transformed into useful data structures for further analysis. Parsing was extended to the processing of syntax trees. Constructing token streams from syntax trees by introducing special tokens (i.e., UP and DOWN tokens) was later introduced to specify tree structure and "imaginary" tokens to capture other syntactic structuring that can be interleaved with the more ordinary tokens derived from lexical analysis (parsing a stream of alphanumeric and other characters to construct tokens). Graph structuring tokens were added to enable graph parsing for transformation and analysis of the graph representations, such as control flow graphs, data flow graphs, and Petri nets, commonly found in compilers. Language processing tools are fundamental to software development; automation of language translation processes speeds and strengthens the development of complex software.

Parsing (also referred to as syntactic analysis) is a process of analyzing a set of symbols that may be in a string or similar format, where a 'string' is sequence of items in this case symbols where the sequence is finite, and the symbols are selected from a set of possible symbols referred to as an alphabet. The parsing process can be applied to natural languages, computer languages and similar systems including DNA sequences. The parsing process applies a set of rules of formal grammar specific to the language being processed. The parsing process is a computer implemented process and the term is used in the sense understood by the field of computer science and more specifically within the field of computational linguistics.

Within computational linguistics the parsing process is further understood to be used to refer to the formal analysis by a computer processor and program of a sentence or other string of words in a natural or computer language where the sentence or string is sorted into its constituents, resulting in a parse tree showing the syntactic relation of each constituent to each other constituent. This parse tree can also contain semantic information and other relevant information about the sentence or string of words being processed.

In some applications within computer science, the parsing process is used in the analysis of computer languages and involves the syntactic analysis of an input code into its component parts in order to facilitate the subsequent functions of compilers and/or interpreters that function to convert code written in one computer language into an executable form, i.e., a computer language that a computer processor is capable of executing.

SUMMARY

A method for processing subroutine-structured graph-based intermediate representations during formal language processing implemented by a computing device, where the method includes classifying a set of subroutines identified in an intermediate representation of code from a source file or set of object files according to mutually recursive relationships between subroutines in the set of subroutines, recording the mutually recursive relationships in a set of subroutine record data structures, labeling relevant nodes in the intermediate representation or tokens from the intermediate representation to track the mutually recursive relationships, constructing a set of graph representations including a graph representation for each subroutine in the set of subroutines, analyzing a graph of the intermediate representation that is decomposed into subroutine graphs from the set of graph representations by serialization through depth-first pre-order graph traversal or path walks through the graph of the intermediate representation, collecting partial positions that distinguish points of action in generated code, where partial positions are tracked in a partial position list of nodes in the intermediate representation that identify points in the graph of the intermediate representation, where each of the nodes is taken from a separate subroutine graph and the list is a backtrace of an invocations that led to a terminal node, and where each node, except a terminal node in the list, references one subroutine from the set of subroutines, labeling nodes of the graph of the intermediate representation or tokens of the intermediate representation from the partial position lists to enable runtime tracking in the generated code so that associated actions are executed at associated places in the generated code, generating a subsequent intermediate representation by serialization of the graph of the intermediate representation through pre-order depth-first traversal, and creating the generated code from the intermediate representation.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one.

FIGS. 12A and 12B are diagrams of an example of graph construction from a collection of partial positions.

FIG. 13A is an example of Java runtime code generated as a result of the labeling process that includes a label transition switch.

FIG. 13B is an example of the Java runtime code with a selection of an action based on a state variable.

FIG. 18 is a diagram of an example of paths that might be encountered during a path walk.

DETAILED DESCRIPTION

Figure 1:
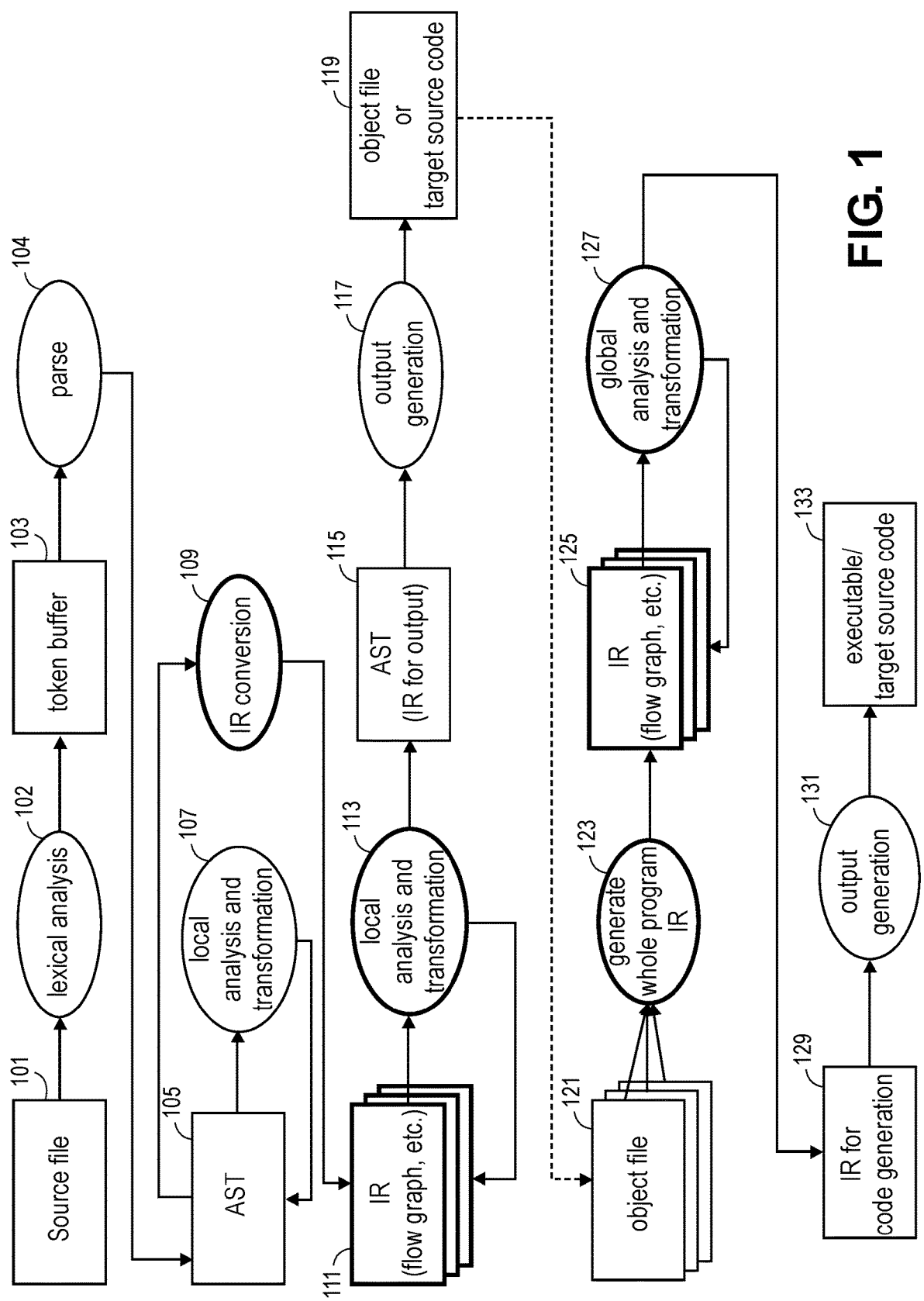
FIG. 1 is a flowchart of an example of a formal language processing.

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art, that the invention may be practiced without such specific details. Those of ordinary skill in the art, with the included descriptions, will be able to implement appropriate functionality without undue experimentation.

The operations depicted in the flow diagrams in the attached Figures will be described with reference to the exemplary embodiments shown in the attached Figures. However, it should be understood that the operations depicted in the flow diagrams can be performed by embodiments of the invention other than those discussed with reference to the attached Figures, and the embodiments discussed with reference to the diagrams in the attached Figures can perform operations different than those discussed with reference to the flow diagrams of the attached Figures.

The techniques shown in the figures can be implemented using code and data stored and executed on one or more electronic devices (e.g., an end station, a network element, etc.). Such electronic devices store and communicate (internally and/or with other electronic devices over a network) code and data using non-transitory machine-readable or computer-readable media, such as non-transitory machine-readable or computer-readable storage media (e.g., magnetic disks; optical disks; random access memory; read only memory; flash memory devices; and phase-change memory) and transitory computer-readable transmission media (e.g., electrical, optical, acoustical or other form of propagated signals—such as carrier waves, infrared signals, digital signals). In addition, such electronic devices typically include a set of one or more processors coupled to one or more other components, such as one or more storage devices, user input/output devices (e.g., a keyboard, a touch screen, and/or a display), and network connections. A 'set,' as used herein, refers to any positive whole number of items. The coupling of the set of processors and other components is typically through one or more busses and bridges (also termed as bus controllers). The storage devices represent one or more non-transitory machine-readable or computer-readable storage media and non-transitory machine-readable or computer-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware.

Overview

Graphs are common in formal language processing, particularly in compilers where they are used to analyze control and data flow; they also have value for grammar analysis and parser generation. This application describes the use of "subroutine graphs" in which graphs are not expanded but are processed as an on-the-fly collection of subgraphs in which vertices (nodes) are referenced in context via a list or stack of nodes from subgraphs that form a coordinates hierarchy. The subroutine graph terminology was chosen in as much as the choice of node groupings used to build such graphs matches the subroutine structuring that is a feature of computer languages, whether in the form of C functions, productions in context-free grammars, or something else. Navigation through a graph using these coordinates structures is described, both for pre-order serialization of graph nodes and for path walks that may follow loopbacks in the graph. A node labeling process is described for translating compile-time coordinates to runtime labels so that the savings in space during compile-time analysis translates into compact runtime size and fast runtime execution.

Introductory Material

Formal languages are described by grammars composed of "rules" or "productions" that define all legal sequences of "characters" that compose sentences in the language. Context free languages are a variety of formal languages that can be described by context free grammars (CFG), where a context free grammar, G, is defined as $$G=(N,T,P,S)$$

where N is the set of nonterminal symbols, T is the set of terminal symbols (characters) allowed by the language, P is a set of productions (or rewrite rules) of the form n->\<sequence of terminals and nonterminals\>, with n a nonterminal;

and S is the start symbol (another nonterminal).

For language processing, CFG specifications are augmented by an alternative operator, "|", so that there is a unique production for each n. This is termed Backus-Naur Form (BNF), which is often extended (EBNF) to include grouping of phrases (phrase), and repetition—A* denotes 0 or more occurrences of A, while A+ denotes one or more occurrences and A? denotes 0 or 1 occurrences. As used herein, nonterminals begin with a lower-case letter and terminals with an upper-case letter; productions are written as a: <sequence of symbols>;

More general formal languages are, in practice, defined in terms of CFGs augmented to support "actions" described in terms of a general-purpose programming language, including semantic predicates. A semantic predicate serves to query context information and invalidates an alternative when the predicate evaluates as false.

Graph Representation

Augmented CFGs can be represented in the form of graphs with directed edges connecting vertices ("nodes"), with each node being occupied by a single terminal, action, or semantic predicate. Since CFGs support recursion, it is also necessary to add two additional node types, which are needed to support the saving and restoration of return context information; logically, these node types push and pop values from a stack, with the POP node determining which node follows based on the value retrieved from the stack. To understand this, consider the recursive production:

a: A a B
|B a C
|D;

In the first alternative, after recognizing A and recursively invoking the return path must involve recognizing B; while after recognizing B in the second alternative and recursively invoking the return path must involve recognizing C. In graph form, before the recursive call (loop back to first invocation of a), it is necessary to insert a PUSH_CONTEXT node; at the end of the production (where the semicolon appears), a POP_CONTEXT node is inserted. For processing convenience, '(' and ')' nodes are also supported—these represent possible decision points (as do the POP_CONTEXT nodes).

If a start production is added of the form
s: E a F;
then it is possible to represent the resulting grammar as the graph.

Special Token Types

In one example implementation described here, most token types referenced in the grammar represent tokens to be matched at run time, but some represent decisions or required processing actions and are present in both the AST and graph representations.

These include:

BLOCK Start of a grouping of alternatives (decision node used when there are alternatives).

EOB End of grouping (decision node for loops).

CLOSURE Decision node for ( . . . )* which is represented in the graph as (( . . . )+)?.

POP_CONTEXT As described above.

PUSH_CONTEXT—as described above

For BLOCK, EOB, and CLOSURE tokens, it is important that the same tokens that are used in the AST representation are used in the graph representation, so that edits in one representation can be read in the other. These tokens are embedded in "carrier" nodes, either in the AST or graph representation or in both.

AST to Graph Conversion

The basic approach taken is to walk the AST for the start production, generating a sequence of tokens. These are then processed in order to build the grammar graph: nonterminal tokens are expanded inline, excepting for recursive productions, which require special handling. Expansion consists of walking the AST for the referenced production (first encounter), or (subsequent encounters) copying the referenced AST and walking the copy; these walks generate sequences of tokens which are processed in order, also expanding nonterminals as they are encountered. When copying, the copied production is renamed, as is the nonterminal reference. Recursive productions are the exception to inline expansion; they are transformed to loops on the fly.

Dealing with Recursion

To track recursion, a stack of nonterminal names is kept that tracks rule nesting during graph construction; before adding another level of nesting, a nonterminal is checked against the contents of the stack; if present, a PUSH_CONTEXT node is added to the graph and to an array of context values for the recursive production. The node contains a context index value which is set to its offset into the array. When expansion of the recursive production is complete, the array is used to create loopbacks from the PUSH_CONTEXT nodes to the beginning of the production in the graph; a POP_CONTEXT node is appended to the graph and looped back to the nodes following the PUSH_CONTEXT nodes in the graph.

Subroutine Graphs for Formal Language Processing

Intermediate representations of languages in compiler and language translation applications typically take the form of tree and graph representations. Going from an expanded graph representation to minimally redundant code generation is a challenging problem. The embodiment presents an efficient approach to graph processing and subsequent code generation that avoids graph expansion. Expanding subgraphs when they are referenced during graph construction can lead to substantial memory usage and redundancy in generated code; in practical applications of the LGLL algorithm, generated files reached tens of megabytes for moderate grammars while the methods described herein shrink the generated source code to a size manageable by modern compilers.

Stack-based processing of rules or subroutines is a standard feature of runtime processing in software. By modeling the runtime processing during compile-time analysis, "entire" graphs can be decomposed into "subroutine" graphs and positions in the larger graph can be represented as a stack of nodes taken from subroutine graphs. Position descriptors that include such node stacks (and other housekeeping information, as appropriate) allow equivalent graph navigation capabilities as can be achieved node-to-node navigation in expanded graphs.

Consider the position descriptor {node0, node1, nodeN}. Node0 is from the primary graph, node1 was called from the node0 graph, and so forth. The challenge is then to traverse an entire graph from such positional information.

The embodiments encompass many elements including 1.) graphs constructed with critical graph elements, 2) pre-order traversal for analysis, 3.) path tracing and breadth-first graph traversal, 3.) path labeling, and 4.) code generation. Each of these elements is described further herein below.

Graph Elements

Formal language processing involves manipulating "tokens" that represent symbols, with each symbol being assigned a numerical value. Symbols are mathematical abstractions; computer automated symbolic reasoning requires a concrete representation of a symbol, i.e., a token. Tokens are data structures (objects) that carry a symbol identifier ("token type") and can include additional information such as parsed text, line numbers, position in line, and similar information.

Formal language processing usually begins with a lexer phase, in which a stream of characters (for this phase, tokens are just numbers that identify characters; in the ASCII encoding, the character 'A' is represented by the number 65) is parsed to recognize groups of characters that form text items that are then arranged into a stream of tokens; at this point, tokens are data objects that contain at a minimum a text string—a group of characters—and an integer-valued token type. The stream of characters can be input from a file or similar input source. Symbols are abstract entities, tokens are instances of data structures associated with integer token type values, and characters are sequences of bytes (e.g., one for ASCII, more for multicode).

Token streams are parsed and arranged into a data structure such as a parse tree or abstract syntax tree. A parse tree contains all recognized tokens from the input source, plus nonterminal tokens that reflect the structure of the grammar used to recognize token sequences. The parse tree also includes tokens that are added as part of the parsing process to represent nonterminal symbols (production names). The parse tree may omit some identified tokens, these omitted tokens are usually limited to tokens that represent white space (blank spaces, tabs, newline characters and the like). An abstract syntax tree ideally contains only those tokens needed to represent the abstract syntax of the recognized text and no traces of the grammar used to construct the tree.

One of the advances in language processing is that abstract syntax trees can be described in terms of tree grammars and tree parsers can be generated from these grammars that process a pre-order traversal of abstract syntax trees. This notion was further formalized in ANTLR 3 with the introduction of "UP" and "DOWN" tokens to describe tree navigation. This further allowed the pre-order traversal to be encapsulated in (tree) token stream objects. Token stream objects provide generic methods—LA(k) to find the token identifier for the kth token of lookahead in the stream, LT(k) for the kth token itself—that make it possible to parse any token stream. In what follows, token streams may be presumed to be instantiated in object form.

From the parse tree or sometimes during the parse, a series of further data structures can be constructed to carry out analysis of the parsed data. The embodiments provide a process and system involving these further data structures that take the form of graphs with nodes (vertices) that carry (typed) tokens. The graphs can be structured as directed acyclic graphs with superimposed loopback edges. A set of edges kept separately from those describing an acyclic graph.

In some embodiments, the edges between nodes of the graphs do not carry or identify information. In other embodiments, where edges might carry information, nodes are added to the graph to carry that information, so that a node is added to split each edge. The result of including these nodes is known as a Petri Net. This structuring of the graphs is convenient for serialization. In other embodiments, unstructured graphs could also be used in concert with sets of (partial) order indices.

In the embodiments, processing is carried out on token streams derived from such graphs. Special tokens are output to describe graph structure, and additional token types—PUSH_CONTEXT and POP_CONTEXT—denote stack manipulations to implement recursion and recognize recursion points. As used herein, capitalized names such as PUSH_CONTEXT refer to example token types.

In an entire graph, PUSH_CONTEXT and POP_CONTEXT nodes in the graph indicate stack manipulation, but recursion in subroutine graphs, referred to as "subgraphs." is more complex. A reference to a subgraph may be recursive, or it may be the top-level call (for that subroutine; multi-level recursion leads to complex relationships between mutually recursive subroutines). For that reason, a PUSH_CONTEXT node is logically dual-purpose. Although to avoid retyping nodes, a PUSH_CONTEXT node in the following discussion usually refers to a PUSH_CONTEXT/NEST pair of nodes. Depending on context the PUSH_Context node is either a stack operation or a NEST operation. Also depending on context, a POP_CONTEXT node may be either a null operation or a stack push.

In some embodiments, there are two forms of NEST operation. For the first case, the NEST operation refers to a subroutine graph by name only (i.e., the subroutine graph has a single-entry point). In the more general second case, the NEST operation names the subroutine graph and specifies an entry point for the subroutine graph. For some problems, like linear generalized LL (GLL) subgraphs have single entry points, but others (like data and control flow graphs) will have subgraphs with multiple entry points.

The Overall Language Processing Method

The embodiments are described with relation to an overall language processing method and compilation process shown in FIG. 1, which includes multiple components and processes that are described in further detail with relation to FIGS. 2-19.

FIG. 1 is a diagram of one embodiment of a compilation process. The process is described relative to a complex language translation or compilation. The process is initiated by input of a source code file (Block 101). The source code can be any type of high-level language. The source file can have any sort of format. A single source file may be input or any number of source files and any amount of source code can be combined for the source code in the source code file is processed by a lexer that applies lexical analysis to the source code (Block 102). The lexical analysis transforms the source file into a stream of tokens. The lexer can apply any type of lexical analysis algorithm to the output of the lexer is placed in a token buffer (Block 103).

The token buffer is parsed (Block 104) to generate an abstract syntax tree (AST) (Block 105). Local analysis and/or other types of transformations (Block 107) can be applied to generate one or more intermediate representations (IRs) (Blocks 109 and 111). These local analysis and transformations can include constant folding—replacing constant expressions with constants, like converting 2*3 to 6—identification of variables, and similar processes. The local analysis and transformations (Block 107) can be sequentially, iteratively, recursively or similarly applied to the AST before the process of converting the AST to one or more intermediate representations (Block 109).

An IR might be a data flow graph, a control flow graph or some other representation of a subset of the source code constructed for a specific form of analysis, including an abstract syntax tree or even just a token buffer. Multiple rounds of local analysis and transformation processes (Block 113) may be applied to the IR. After the rounds of local analysis and transformation, the IR is converted back to an AST (Block 115). The AST is processed by a tree parser or visitor (Block 117) to generate a set of object files or target source code (Block 119).

In a second phase of the compilation process, usually described as "linking" a set of object files that correspond to source code for an entire or whole program that is generated by the first phase (Blocks 101-119) is processed to generate one or more whole program IRs (Block 123). These IRs may take the same form as those for local optimization (Block 125). The IR is then processed by a set of global analysis and transformation processes (Block 127) that can be analogous to the local optimization and transformation processes. The global analysis and transformation processes can include variable removal, memory scheduling, and similar processes. These global analysis and transformation processes can be sequentially, serially, recursively, or similarly applied to the IR. After completion of the global analysis and transformation processes, the IR is prepared for code generation (Block 129). The IR then processed (Block 131) to generate an output file (Block 133). The output file can be a target source code, an application executable or similar end product (Block 133).

Figure 2:
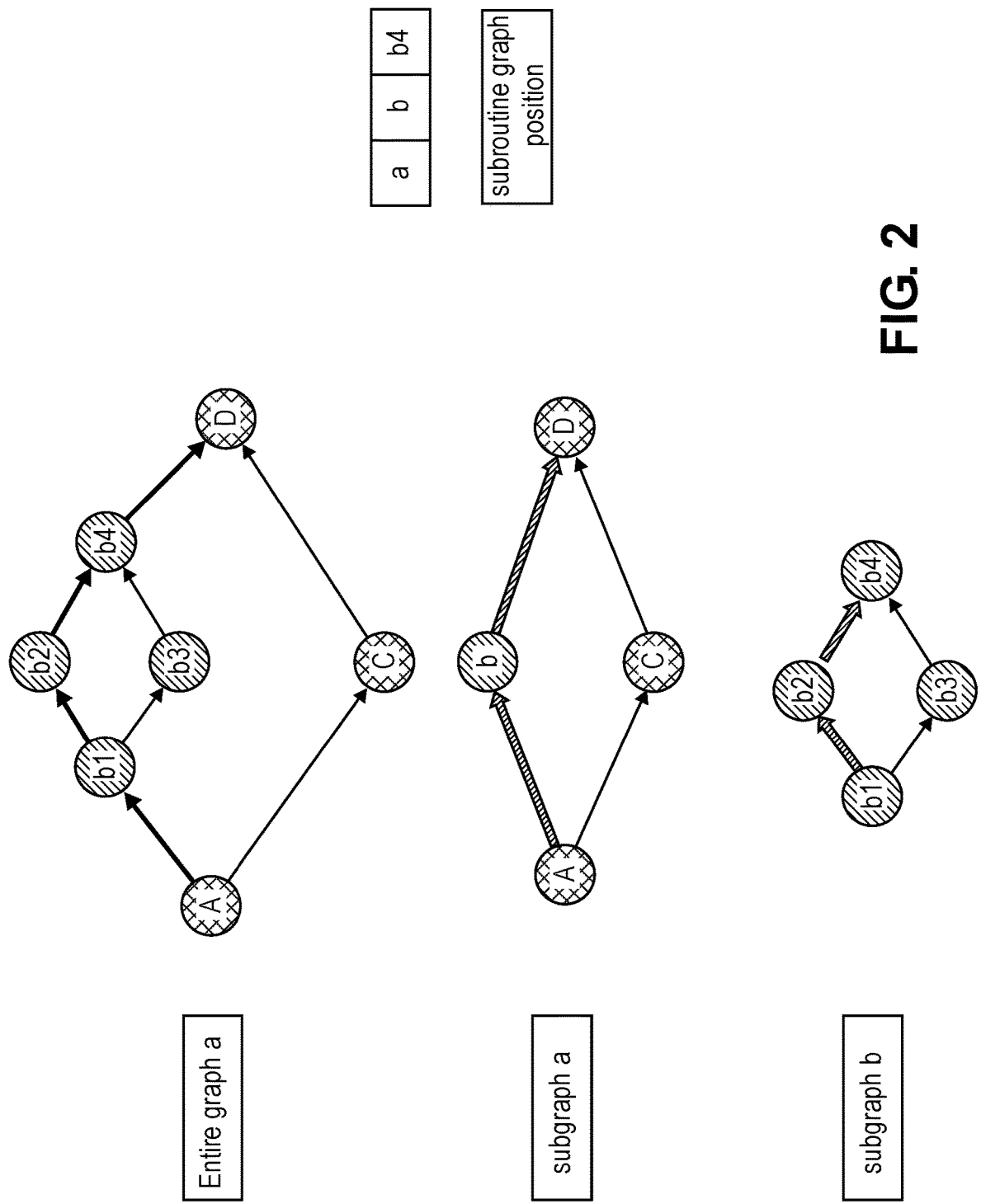
FIG. 2 is a diagrams of an entire graph and a set of sub-graphs within this graph.

The further processes of the embodiments described herein below with relation to FIGS. 2-19 are primarily implemented in the IR conversions (Block 109, 111), local analysis and transformation processes (Block 113), whole program generation in cases of multi-file processing (Blocks 123 and 125), and global analysis and transformation (Block 127) of the overall compilation process illustrated in FIG. 1. The above-mentioned IRs can be in the form of graphs of the source code. The various processes of the embodiments operate on these graphs by breaking them into sub-graphs. FIG. 2 is a diagram that illustrates an example entire program graph. FIG. 2 also includes diagrams illustrating the restructuring of the entire program graph into two subroutine graphs 'a' and 'b'.

FIG. 2 identifies an example path 203 across the entire graph. Walking, i.e., traversing, the example path 203 proceeds through positions in the entire graph. The path 203 is illustrated by dotted lines that connect node A, node b1, node b2, node b4, and node d. The path can similarly be described:

{a: A}, {a: b, b1}, {a: b, b2}, {a: b, b4}, {a: D}.

In the positions described above, subgraph a is referenced by name, while the remaining elements are graph nodes. There is no node referencing the start node in a graph, so the primary subgraph can be referenced by name, unless it is subsequently referenced again as a recursive call. The process can also include a positional marker 227 and an array 225 for describing points of transition between the entire graph and the sub graphs.

Figure 3A:
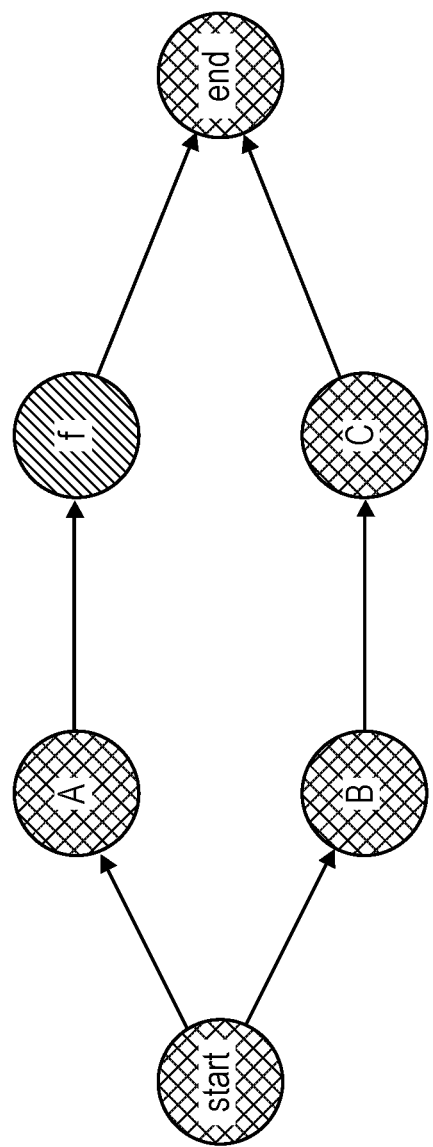
FIGS. 3A-C are diagrams of one example embodiment of a set of recursive subroutine graphs.
Figure 3B:
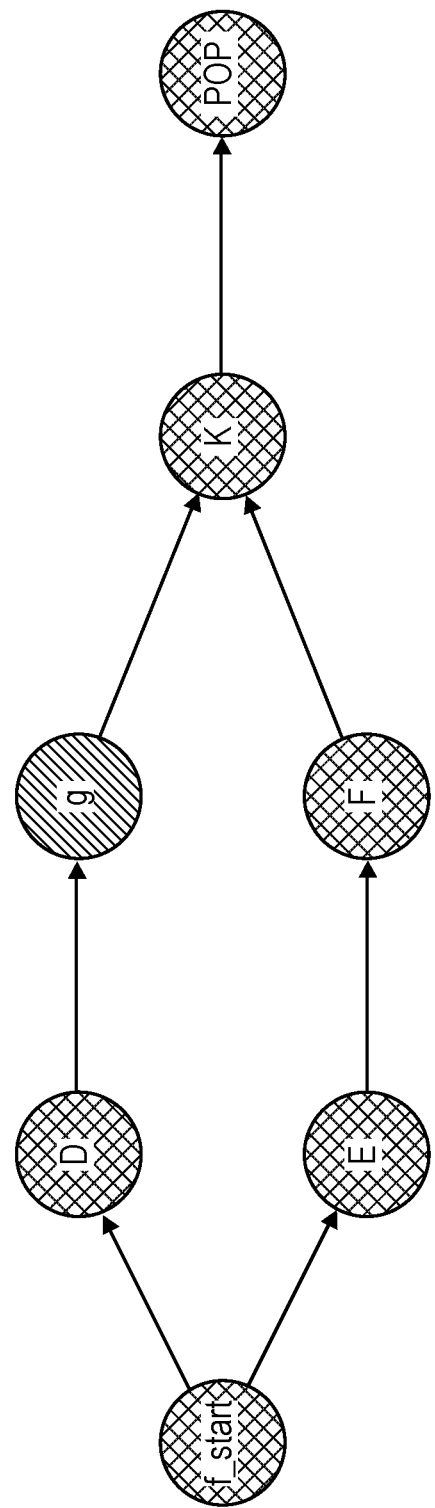
Figure 3C:
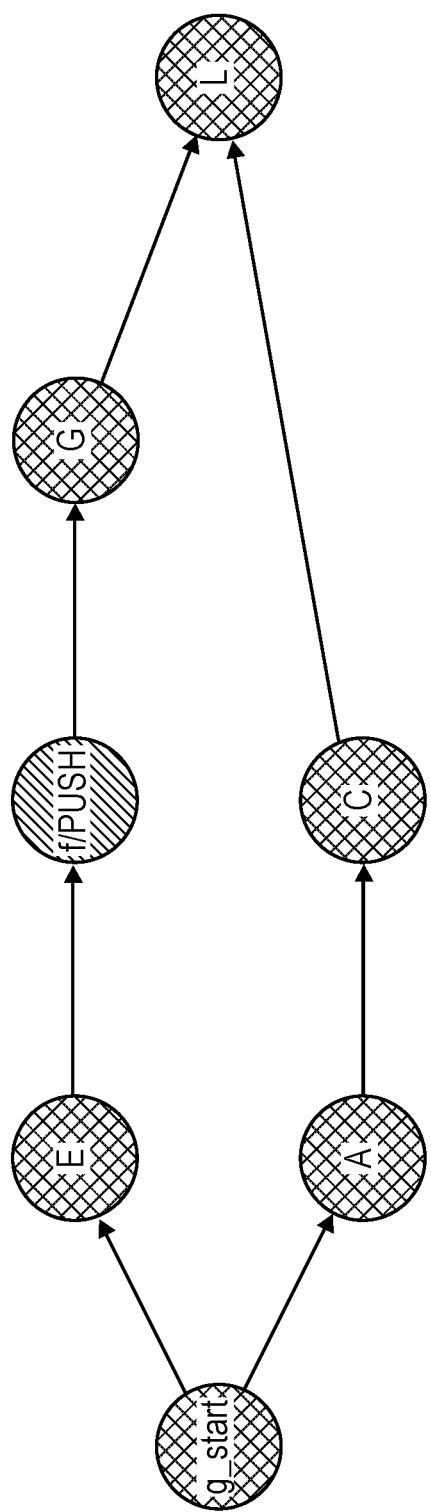

FIGS. 3A-C are diagrams of one example embodiment of a recursive set of subroutine graphs. Three subroutines (FIGS. 3A-C) are illustrated as graphs. The first subroutine (3A) graph includes a set of nodes including a node that calls a subroutine f, which is illustrated as subroutine (FIG. 3B). The second subroutine includes a set of nodes including a node that calls a subroutine g. The third subroutine (FIG. 3C) includes a set of nodes including a node that calls the first subroutine for f, which is a recursive call. The node that calls subroutine f recursively has a PUSH_CONTEXT type. The PUSH_CONTEXT and POP_CONTEXT types (abbreviated to PUSH and POP in the figure) trigger context stack manipulation during path walks, as will be described further herein below.

Figure 4:
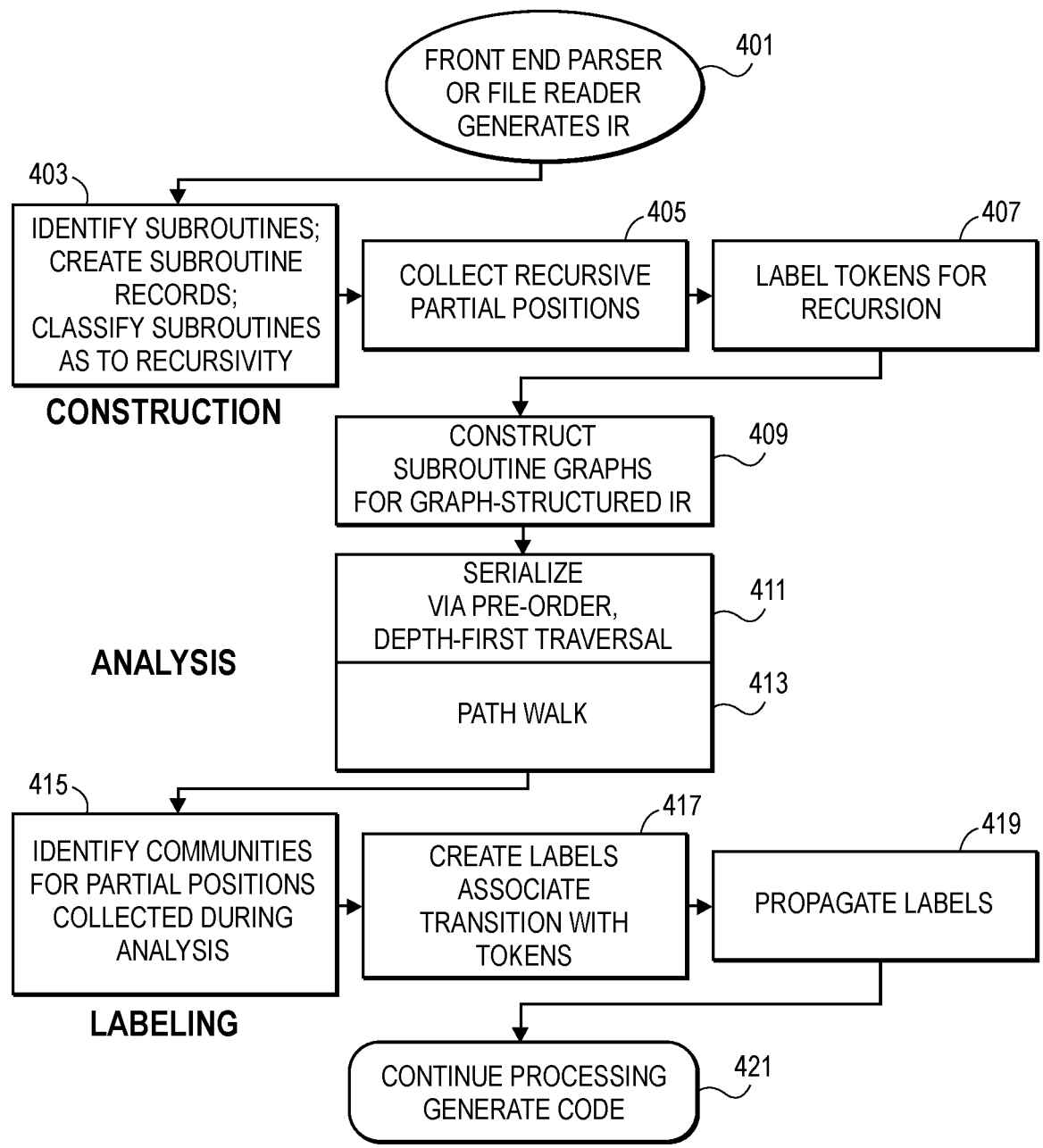
FIG. 4 is a diagram of one embodiment that demonstrates how the processes and systems described herein fit into a graph-based intermediate representation (IR) construction and analysis.

FIG. 4 shows the process that results from integrating subroutine graphs with the processing of a graph-based IR. Prior to graph construction, but after the preceding representation has been decomposed into subroutine form (i.e., a token stream can be provided for each subroutine), subroutines are classified to determine recursive relationships between subroutines, partial positions for recursion points (points where subroutine 'a' calls 'a' or 'a' calls 'b' calls . . . calls 'a') are collected, and these partial positions are used to label nodes to track recursion context. Recursion labeling can be deferred but must precede the context-dependent labeling for actions.

The process starts (Block 401) with the generation of an intermediate representation, such as an AST. This may be the result of parsing a file and constructing an IR or from a file reader that constructs an IR from multiple files; there may be multiple IR passes before generating the IR coming out of block 401. Single file parsing is normal for compiler front ends; multi-file reading is a characteristic of linkers. This IR is then used in block 403 to identify subroutines, construct records for those subroutines, and classify (via the process to be laid out in FIG. 5) the subroutines as to the recursive relationships involving one or more subroutines. The next step (block 405) is to collect partial positions (in this case, the positions use tokens instead of nodes) for recursive invocations using the process to be laid out in FIG. 6. These partial positions are then used (Block 407) to label recursive tokens.

Following this, subgraphs are constructed (Block 409) which are then used for analysis (Blocks 411 and 413). Details of the analysis depend on the specific problem being addressed (control flow, data flow, SSA wavefronts, or whatever), but the analysis will involve processing nodes/positions in an order created by serialization (Block 411 via the process of FIGS. 7-10), then carrying out path walks (Block 413 via the process of FIG. 19) to gather information. The output of this step is to construct a list of partial positions and associated actions; these are then used for creating labels and transition records (Blocks 415-417 as will be laid out in FIGS. 11-17).

After graph construction, graph serialization through preorder, breadth-first traversal and path walking are used during analysis. For analyses which identify context-dependent actions, path walking is associated with collecting positions that select such actions; these positions are used for context-dependency labeling. Not all analysis problems require both forms of graph traversal, but at least one of these two will be employed.

Following analysis, context-dependent labeling is carried out. Context-dependent labeling provides the basis for later analysis and construction of runtime finite-state automata for determining context in selecting an appropriate action to be taken. Graph serialization may be used in constructing a succeeding IR or for code generation.

Recursion Analysis

From a subroutine graph perspective, recursion—and returns from recursive calls—are jumps from one position in one subroutine graph to another position in another or the same subroutine graph. Instead of nesting subgraphs when a recursive call is encountered when following a path through the entire graph, the current position is saved, and the position is set to the root call (that is, the current position is reset to what it was when we originally invoked the recursed call). For example, a copy of the position {a, b, c, d, e, c} can be saved and the position is reset to {a, b, c} before continuing the walk. When the next POP_CONTEXT node is encountered, assuming no intervening PUSH CONTEXTs, is encountered, the walk continues from the node following the terminal c in {a, b, c, d, e, c}.

Before being able to insert PUSH_CONTEXT and POP_CONTEXT nodes into a graph, it is necessary to determine which subgraphs are recursive and to identify recursion chains—sets of subgraphs that are mutually recursive. This is achieved by doing a preorder walk of some subroutine representation (e.g., ASTs, token buffers, or subgraphs) to identify recursive positions in the graph. Subgraph records are constructed, and as recursion points are encountered, records are marked as recursive, and recursion chains are constructed: {a, b, c, d, e, c} results in noting that c, d, and e all belong to the same recursion chain. Subgraph records are data structures that record properties of a subroutine graph. Once the records are constructed and recursive subgraphs noted, subgraphs are constructed with PUSH_CONTEXT and POP_CONTEXT nodes inserted. As used herein, the term "record" refers to a subroutine record.

One of the challenges of multi-level recursion is determining recursion indices. A recursion index is a data structure used to identify which of n possible recursions that a given recursion is. Such recursion indices are computed for subroutine graphs but have absolute values in an entire graph.

Figure 5:
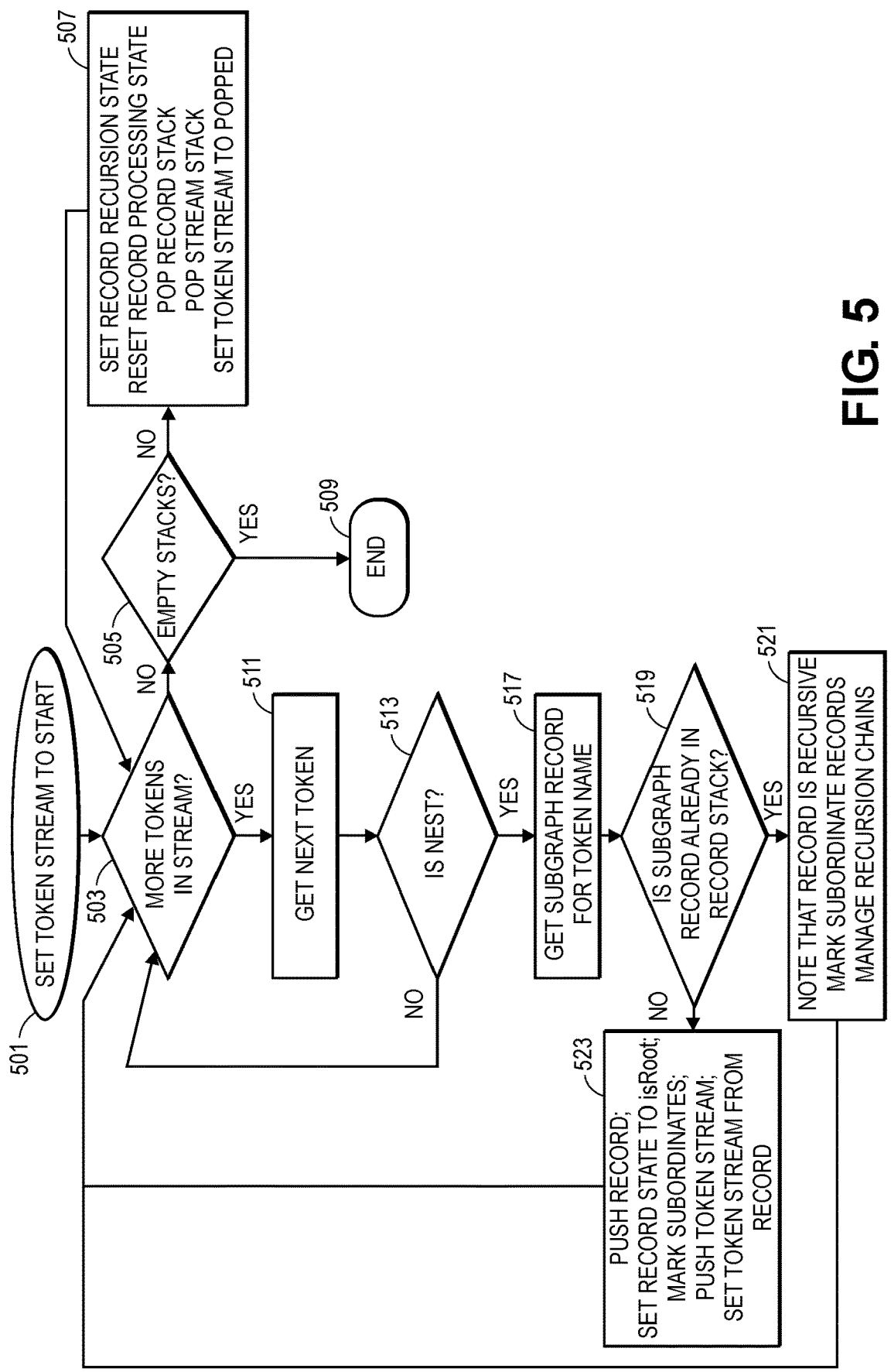
FIG. 5 is a flowchart of one embodiment of a token categorization process.

FIG. 5 is a flowchart of one embodiment of a process of determining realized recursion relationships and storing the results in a set of subroutine records. Mutually recursive subgraphs can be invoked in a variety of ways, but only some of the invocation patterns appear—are realized—in the entire program graph. For example: A calls B; B calls C; C calls A and C, but only A is invoked directly so A is primary, and C is secondary (B does not recurse). In other grammars, B and C (and A) might appear as primary. Any subroutine in a recursion chain could be considered a primary subroutine, i.e., a subroutine called directly, rather than from one of the other subroutine members of the subroutine chain, depending on entire graph structure. Starting from the entry subroutine, the entire graph is walked to identify recursive subroutines.

In one embodiment, the entire graph is walked to identify recursive subroutines prior to subgraph construction. Thus, the process described in FIG. 5 shows tokens coming from token streams (Block 501). In this example, two stacks are maintained: a records stack for subroutine records, and a token stream stack for token streams. Subroutine records are used to track information about individual subroutines, such as the associated subroutine graph. Some of this information deals with recursion, while other information is application-specific. The information can include whether a subroutine is recursive, and information about other mutually-recursive subroutines that it invokes. The list of such subroutines is termed a subroutine chain. The information can include whether a recursive subroutine is a primary subroutine, i.e., is a subroutine invoked by subroutines not in the recursion chain. The information can include whether a recursive subroutine appears as a secondary root; which is, whether a recursive invocation is encountered during processing after being called directly or indirectly by a primary subroutine. Such information is collected for reference during subsequent processing. Token streams are used to access tokens from subroutine graphs via a pre-order, depth first traversal. The focus of the processing described with relation to FIG. 5 is to record recursion information. In this example, individual tokens in the token stream are ignored unless they represent subroutines, in which case these tokens are either recursive calls or are directly called, in which case the corresponding record is pushed onto the record stack and the token stream is pushed onto the token stream stack and the current token stream is set to correspond to the call. Recursive calls can be handled by a special action.

For recursive calls, the active record is noted as being recursive. The index of the record in the record stack is found. The state variable "isRoot" is set to true for that record. All records from that point in the stack to the top of stack are labeled as recursive. All records following the index record in the stack are noted as being subordinate. Both the "isRoot" and "subordinate" record states are temporary state variables. Each of these intervening records belongs to the same recursion chain such that where the intervening records currently differ, the recursion chains are consolidated.

When a token stream is exhausted, the temporary state variables, isRoot and subordinate, are examined before being reset. If the top-of-stack record is marked isRoot and subordinate, then that record is identified as being primary, otherwise it is marked as being secondary. By the time an actual primary record is reached, the recursion chain for that record will have been completed. Multi-level recursion relationships ensure that any record marked as primary is in fact a primary record. A record can be primary in one context and secondary in another, and the record can be neither primary nor secondary in a third context.

As the process is illustrated in FIG. 5, the classification process for identifying realized recursion relationships can be initiated by setting a token stream to a start position (Block 501). A check is made whether there are more tokens available in the stream (Block 503). If there are no tokens in the stream, then a check is made whether both stacks are empty (Block 505). If both stacks are empty, then the process completes (Block 509). If both of the stacks are not empty, then the process sets a record recursion state, i.e., —primary, secondary or neither, according to the values of the isRoot and subordinate variables. The process resets isRoot and subordinate to false, pops the records stack, pops the stream stack and sets the token stream to the popped stream (Block 507). After this stack manipulation of Block 507 is complete, then the process continues by checking whether there are additional tokens in the token stream to be processed (Block 503).

If there are more tokens in the token stream, then a next token is selected to be processed (Block 511). Any selection mechanism can be utilized, in some embodiments, the tokens are processed in the order they occur in the source file or in a similar ordering. The selected token is analyzed to determine whether the token is a 'Nest' token or token indicating a nesting structure in the input token stream (Block 513). If the selected token is not a token indicating nesting, then a check for further tokens (Block 503) and a next token is selected (Block 511).

If a selected token is a nesting token, then the process gets the subgraph record for this token (Block 517). Once the record for the token is retrieved, a check is made whether the record is already in the records stack (Block 519). If the record is not found in the record stack then the process pushes the record onto the record stack, pushes the token stream, and sets the token stream from the record (Block 523). If the record is found in the record stack, then the record is marked, or it is recorded that the record is recursive and recursion chains are managed (Block 521). isRoot is set for the record and other records that follow in the record stack are marked as subordinate. In both cases the process then continues by checking for further tokens to process (Block 503). When all of the tokens are processed, and the process ends, all subroutine records are properly classified as to their recursion properties. For the most part, this information is used to avoid unnecessary processing; relative recursion position collection, for example, only processes recursive records.

Figure 6:
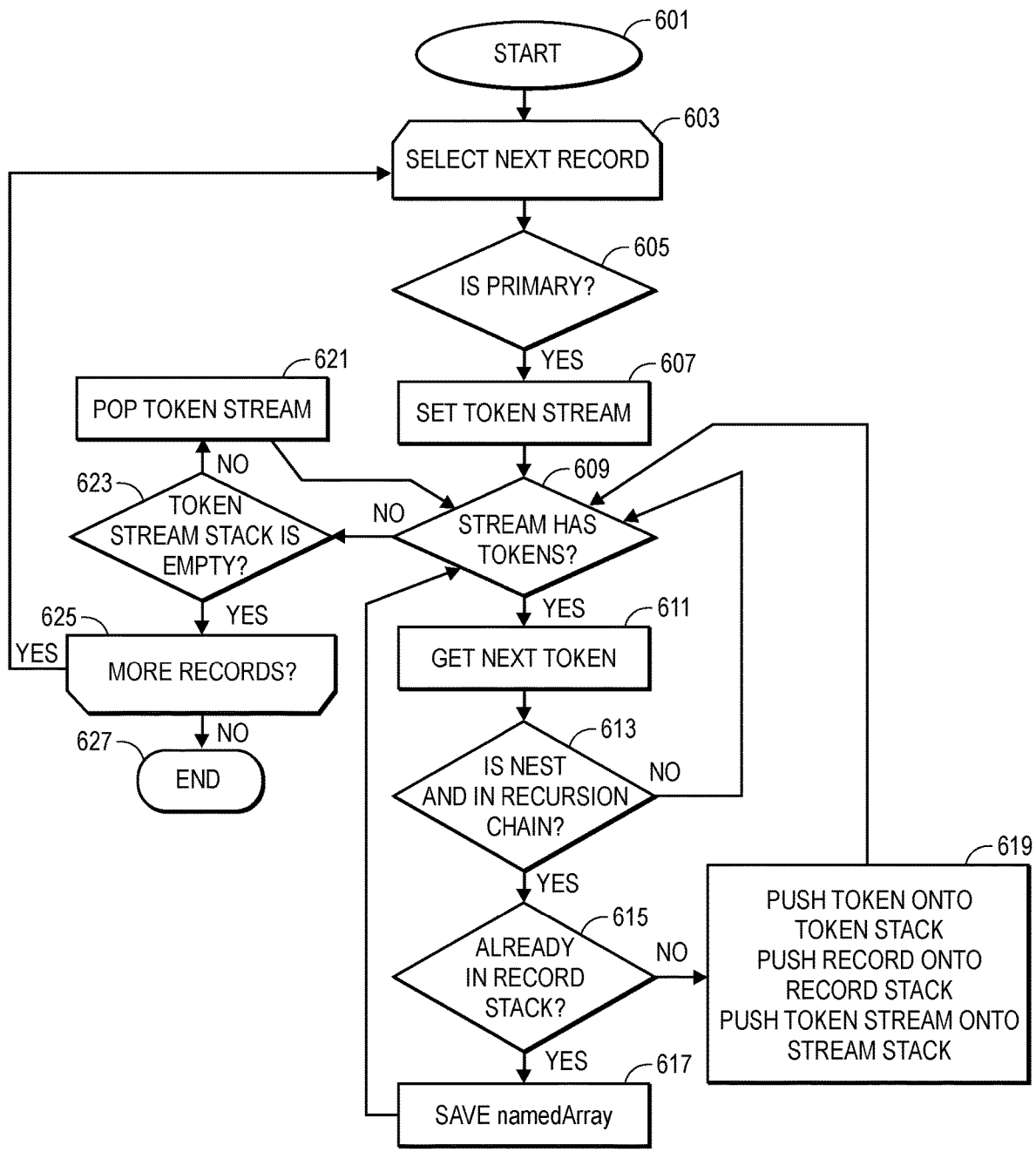
FIG. 6 is a flowchart of one embodiment of a recursion point handling process.

FIG. 6 is a flowchart of one embodiment of a process for collecting relative recursion positions—relative because they are determined starting from each primary recursive subgraph rather than from the entry for the entire graph. To convert a relative position to an absolute position, the current (absolute) position is truncated to the primary invocation and the relative position appended. Thus, given the relative position {c: f, g} and current position {a, b, c, d, e}, {a, b, c, d, e} is truncated to {a, b, c}, then {e, f} is appended to convert the relative position to an absolute position to of {a, b, c, f, g}. These relative positions are used in path walks and for labeling.

This process can start (Block 601) by selecting a next subroutine record (Block 603). The next record can be selected by any selection mechanism. A selected record is inspected to determine if it is a primary record (Block 605). If the record is not a primary record, then a next record is selected (Block 603). If the record is a primary record, then a token stream is set (Block 607). A check is then made whether the stream contains token (Block 609) to enter the token processing loop. This can effectively be a no-op; recursive subroutines have tokens.

The selected token is inspected to determine whether the token has the NEST token type and is in a recursion chain (Block 613). If the selected token is not a NEST token and is not in the recursion chain, then a next token is selected (Block 609). If the token is a NEST token and is in a recursion chain, then the current (relative) position is saved into a named array (Block 617). If the token was not in the records stack, then the token is pushed onto the token stack, record is pushed into the record stack and the token stream is pushed onto the stream stack (Block 619). In either case the process continues to select the next token to process (Block 609). In this case, the full "next token" decision process is invoked. If the current token stream has been exhausted, then the token stream stack is tested to see if it is empty or not (Block 623). If not, the token stream stack is popped, and stream processing continues with the popped token stream. If the token stream stack is empty, then the process continues with the next record loop (Block 625) and then exits the process.

Graph Parsing

Pre-order serialization is a process that makes it possible to parse a graph. In contrast, token streams can be parsed, regardless of how they are created.

Pre-Order Depth-First Serialization for an Entire Graph

The pre-order depth first serialization process is described here is done via a graph traversal process. The process is utilized in the construction of a token stream, with some logic added for tokenization and to deal with the problem of recursion. The graph to be processed has a single start node and a single end node. Each node in the graph has "before" edges and "after" edges. Graphs for representing formal language are strongly directed and have a regular structure with fork and join points.

Relevant definitions for pre-order depth first serialization include:

nodeOffset is the number of active elements in the arrays discussed below.

Arrays: There are three relevant arrays for this process: fanNodes, fanout, and nodeIndex. The fan nodes are an array of nodes that have multiple after edges, fanout is an array of after edge arrays, and nodeIndex is an array of indices into the after-edge arrays.

Table: a table maps nodes to a number of times they have been encountered (e.g., join or before index value). Since a fork/join combination can be encountered more than once, every time a join node has finished processing, its value in the table is reset to 0.

Figure 7:
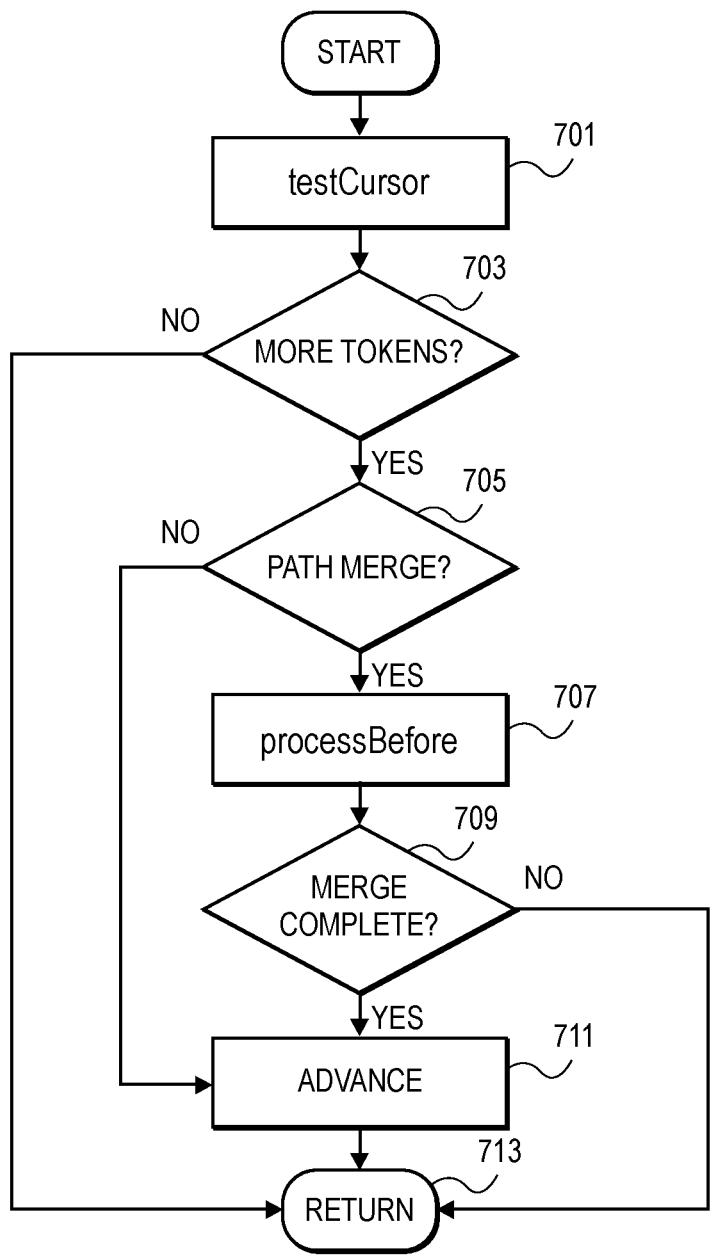
FIG. 7 is a flowchart of one embodiment of a token serialization process.

FIG. 7 shows the high-level processing logic that is valid for both entire graph traversal and subroutine graph traversal. The pre-order depth-first serialization process starts by setting a cursor to the start node of the graph. Then the process carries out an addTokens processing cycle, where a testCursor process (Block 701; Null operation for entire graphs) is performed. A test is carried out to see if there are more tokens to be processed (Block 703); if not, then the process returns from the addTokens process. If there are more tokens to be processed, then a test is carried out (Block 705) to see if there is a path merge to be processed. If there is no path merge to process, then the process skips to the advance operation (Block 711).

The process then performs a processBefore operation (Block 707), and a test (Block 709) to determine if all merging paths have been processed for this merge; if no additional merges remain to be processed, then the process returns (Block 713). If there are additional merges to process, then the process carries out the advance process (Block 711) and then returns (Block 713).

In the non-subroutine-graph case, the processBefore operation includes, from the table that maps nodes to a count of preceding encounters, getting the join index value for the current path, and incrementing the mapped index value. The process then emits (i.e., adds to the token stream) a TERMINUS token that references the current cursor.

The process increments the current nodeIndex value. If the current nodeIndex value is less than the current count of fanout edges, then the process sets the cursor to the next path from the current fanout. Otherwise, if the nodeIndex value equals the number of before edges, then the process emits a JOIN token that references the before edges and proceeds to the succeeding merge complete test (Block 709) which then evaluates to "yes" causing the process to perform the advance process (Block 711).

If the current nodeIndex equals the number of fanout edges, the process emits an ENDFORK token that references the current cursor. A nodeOffset is decremented. If the index value equals the number of before edges, then the process continues to the completion test (Block 709) which evaluates to "yes" causing the process to perform the advance process (Block 711). If the index value doesn't equal the number of before edges, then the process sets the cursor to the next path from the current fanout, incrementing the current nodeIndex, and proceeds to the test (Block 709) which evaluates to "no" causing the process to return.

In some embodiments, the advance process determines if the node at the cursor is an endpoint for one or more loopbacks, then the advance process emits a LOOPJOIN token that references the current cursor. If the node at the cursor has more than one before edge, then the advance process emits a TARGET node that the references the cursor.

The process can then emit the token value for the current cursor. If the node at the cursor has multiple after edges, then the process emits a FORK token, increments the nodeOffset, sets the fanNode and fanout and sets nodeIndex[nodeOffset] to 0.

If the node at the cursor has loopbacks, then the process emits LOOPBACK tokens that reference LOOPJOIN nodes. The process then sets the cursor to fanout[nodeOffset][0] if the node is a fork, otherwise, the cursor is set to the node following the current cursor. The process then ends the addTokens cycle. The process incrementally processes the tokens added to the token stream. If the last addTokens cycle added 0 tokens, then the process stops, otherwise the process continues to the next cursor node.

Pre-Order Depth-First Serialization for a Subroutine-Structured Graph

The pre-order depth-first serialization process is adapted for graphs that include subroutine graphs. To track the state of the traversal of the entire graph, two stacks are used. A node stack is used that tracks position with relation to subroutine graph nesting. A record stack is used that includes a set of records that record the properties of the rule/production/subroutines that are encountered during the traversal. Additionally, the process uses a map of records indexed by subroutine graph name.

As NEST type nodes are encountered during the traversal, the NEST type node is pushed onto the node stack, the corresponding record is recovered and pushed onto the record stack, and the corresponding subroutine graph is fetched. Traversal of the entire graph continues with the node at the referenced entry of the subroutine graph. At the end of a subroutine graph, node and record stacks are popped, and traversal continues with the node following the popped node.

Figure 8:
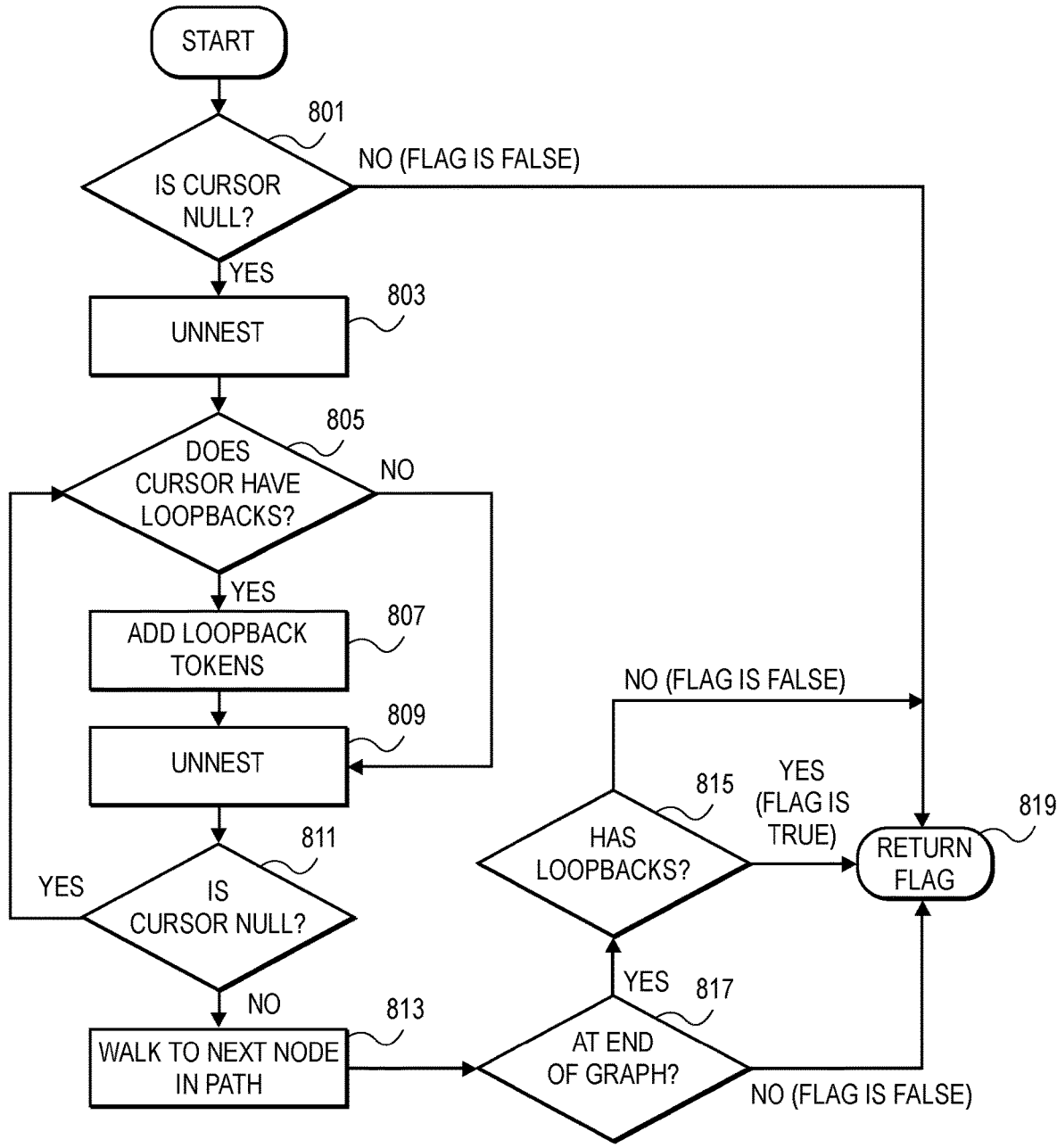
FIG. 8 is a flowchart of one embodiment of a test cursor process.
Figure 9:
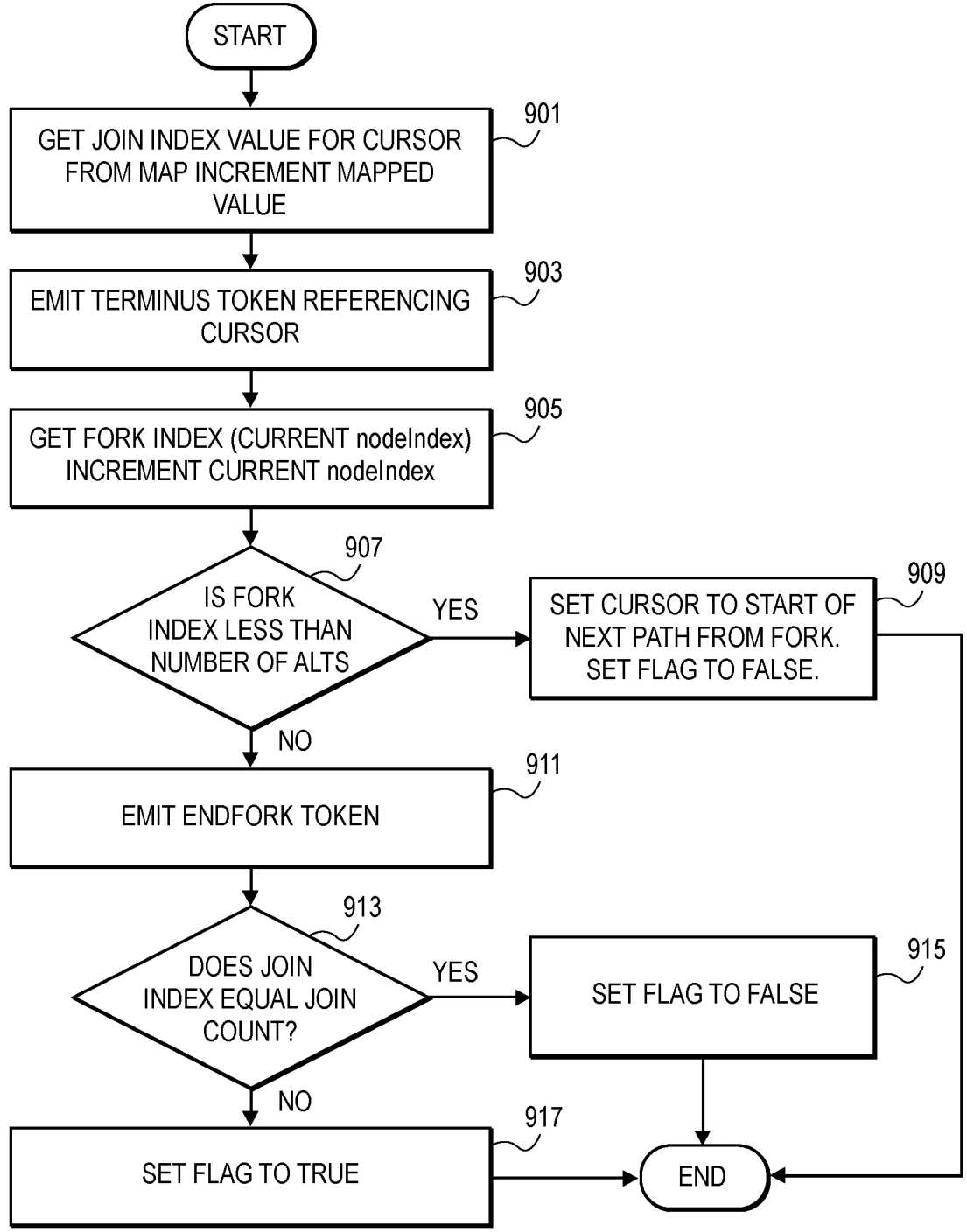
FIG. 9 is a flowchart of one embodiment of a 'before' processing for the test cursor process.
Figure 10:
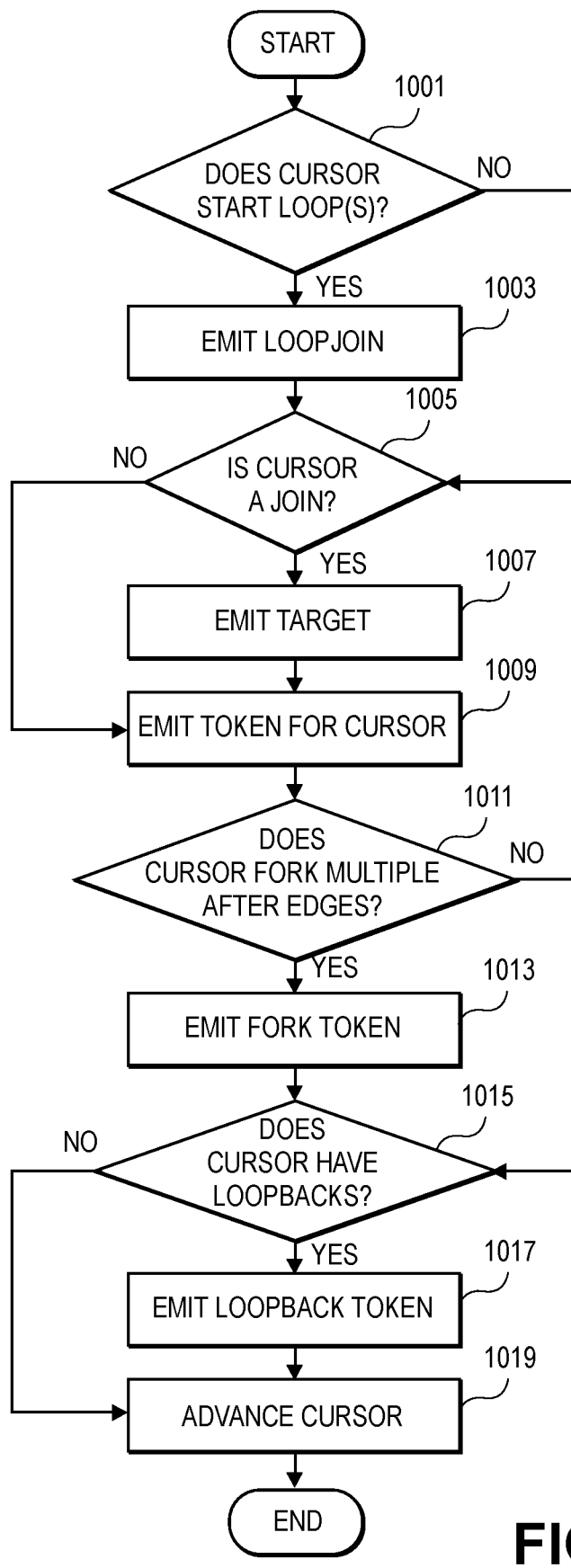
FIG. 10 is a flowchart of one embodiment of an 'advance' processing for the test cursor process.

FIGS. 8-10 elaborate the subprocesses from FIG. 7 for subroutine graphs: FIG. 8 illustrates the testCursor logic, FIG. 9 illustrates processBefore, and FIG. 10 illustrates advance.

FIG. 8 is a diagram of one embodiment of the process for the testCursor function. The testCursor function ensures that the cursor is non-null providing that there are still nodes to be traversed in the graph. The testCursor function begins with asking whether the current cursor is null (Block 801). If the cursor is null, then the process returns false (Block 819), indicating this is not the end of the graph. Otherwise, the process performs an unnest operation (i.e., pop the node stack, and set cursor to popped value) (Block 803). If the new cursor has loopbacks (Block 805), emit a LOOPBACK token (Block 807). If the cursor is at the end of the subgraph, repeat the unnest (Block 809) and continue (Block 805) until either the end of the (entire) graph is reached (Block 817) or the cursor has a following node (Block 813). The end-of-graph token is special. This token is not emitted, but may have loopbacks (Block 815), and the return value indicates that.

As mentioned herein above, merge nodes can be handled with special processing. The next node either begins the next path from the latest fork or finishes processing that latest fork and may merge previous forks. The associated processing requires a fork index (start of path segment) and a join index (end of path segment). FIG. 9 is a flowchart of one embodiment of the processBefore function from FIG. 7 that implements this merge logic. The first step is to fetch the join index and to increment its stored value (Block 901), then to emit a TERMINUS token to mark the end of a path segment (Block 903). Then the fork index is fetched (Block 905) and compared with the number of alternative path segments in that fork (Block 907). If this is not the last path segment from that fork, set the cursor to start the next path segment from that fork (Block 909) and return. If it is the last path segment from the fork, then the process emits an ENDFORK token (Block 911) and does join processing (Blocks 913-917).

FIG. 10 is a diagram of one embodiment of the advance function from FIG. 7. The advance function emits a token for the cursor and any associated graph structure tokens before advancing to the next node in the current path. The first step is to determine whether the cursor start any loop(s) (Block 1001). If the cursor does start a loop, then the process emits LOOPJOIN tokens (Block 1003). Then the process checks if the cursor is a merge or join (Block 1005), and if so emits a TARGET token (Block 1007). The process then emits a token for the cursor (Block 1009). If the cursor begins a fork (Block 1011), then the process emits a FORK token (Block 1013). If the cursor ends a loop (Block 1015), then the process emits a LOOPBACK token (Block 1017). Then the process advances the cursor to the next node in the path and returns (Block 1019).

Labeling

Since any node may be present at multiple positions in the entire graph, generated code for that node may have multiple versions so that it is necessary to determine which version is valid in a given context. That is, it is necessary to track context for parts of the entire graph at runtime, when the graph is no longer available. This is done with numeric labels, and generated code then takes the form:

```
int saveState = ruleState;
switch (ruleState) {
case A:
    ruleState = A1;
    break;
case B:
    ruleState = B1;
    break;
...
}
call subroutine( );
ruleState = saveState;
```

The terminal switch will select a function to be executed. Labels track context; a partial position like {c, d, e} encountered during analysis is translated to a label sequence like {DEFAULT, LABEL_a, LABEL_b}. Prior to invoking the subroutine, there will be a switch containing a default case that sets ruleState to LABEL_a. Prior to invoking b, there will be a case LABEL_a:
ruleState=LABEL_b;
break;

and then c is associated with case LABEL_b:
function_c0( );
break;

To get to this sequence of runtime actions, a data structure containing a reference to DEFAULT and LABEL_a is stored into an array associated with a, {LABEL_a, LABEL_b} with b, and {LABEL_b, function_c0} with c.

Figure 11:
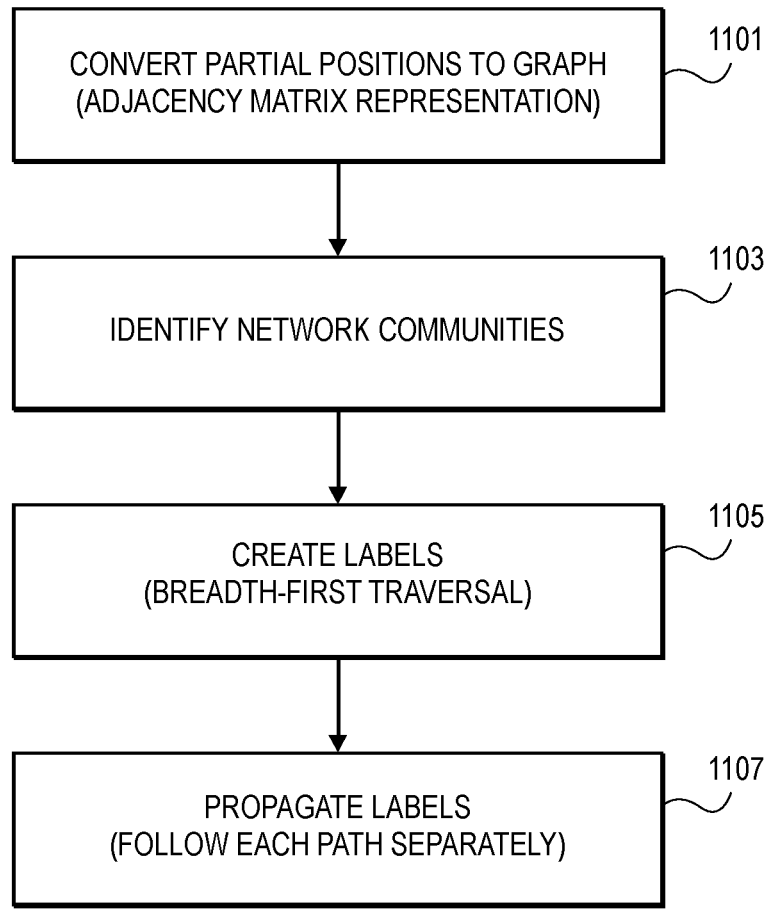
FIG. 11 is a flowchart of one embodiment of a labeling process.

Labeling is carried out as a four-step process, as shown in FIG. 11: convert a collection of partial positions that require labeling to a graph, identify networked communities from that graph, create labels during an initial set of breadth-first traversals over each community, then propagate those labels to cover all relevant contexts.

Tracking all positions in the entire graph would generate an unmanageably large body of code for most formal language problems, so it is necessary to label as little of the generated code as possible. In some embodiments, labels would only track the partial positions of interest and only label the nodes/tokens that make up those partial positions. Fortunately, there is a graph-based solution. An alternative representation of a graph is in terms of nodes (vertices) and an adjacency matrix, A, for which $A[i, j]=1$ if $node_i$ connects to $node_j$
$A[i, j]=0$ if it does not.

The relevant property of adjacency matrices is that $$M=A+A^2+A^3+\ldots$$

has the property that

M[i, j]=1 if $node_j$ is reachable from $node_i$ and 0 if it is not.

Nodes for which M[i, i]=1 are of particular interest because they belong to communities of nodes. A community in a graph is a maximal set of nodes for which given any two nodes {a, b} in the set, there is a path from a to b and from b to a. This notion of community is critical for social network analysis.

Applying this concept to subroutine graphs, partial positions can be converted into logical graph elements with node0→node1, node1→node2, and so forth, then adding noden→node0 to ensure that the nodes belong to a community.

FIG. 12 shows an example of such graph construction. In the example shown.

Loopbacks are shown with dotted lines: loopbacks are used in community detection, but not in subsequent labeling passes, except for recursion labeling. After doing this for each of a set of positions, an adjacency matrix can be constructed, and communities identified. As discussed earlier, "node 0" might be a subroutine graph name rather than an element that is or will become a node in a subroutine graph. In a vertex list/adjacency matrix representation, the vertices can have fairly disparate data types.

Once communities are identified, a breadth-first matching approach is used to create and assign labels to nodes/tokens. Labeling consists of adding a {predecessor, value} pair to a transition array for the node being labeled. The first node is labeled {"default", value0}, the next node gets labeled {value0, value1}. Terminal nodes are labeled with a "function" value.

First, those positions beginning with nodeA are collected, nodeA is labeled, then attention shifts to nodes following nodeA. The first of the collected positions, for example, can have nodeB at position1. All of the collected positions are scanned for nodeB in position 1, and those are collected and removed from the set. This process continues, both in collecting nodes from the reduced set of positions, and in proceeding down nodes in positions until all positions have been processed.

Labeling involves attaching transition records to nodes/tokens, where a transition record is a data structure containing a prior label, a current label field that is set for all but terminal nodes, and a function value which is set only for terminal nodes. This allows creation of runtime code like that in Figure EX1.

The goal of the labeling process is to incorporate state machines in the generated code to choose from among a set of possible context-dependent actions (function invocations) at points in the generated code. FIG. 13A shows an example of Java runtime code with a transition switch. In the transition switch each alternative case changes the value of a state variable, in this example case "ruleState." FIG. 13B shows the Java runtime code with a selection of an action based on the then current value of "ruleState." [Not shown is the saving of "ruleState" before each transition switch, and restoration following return from the function invocation that led to the action selection.]

Figure 14:
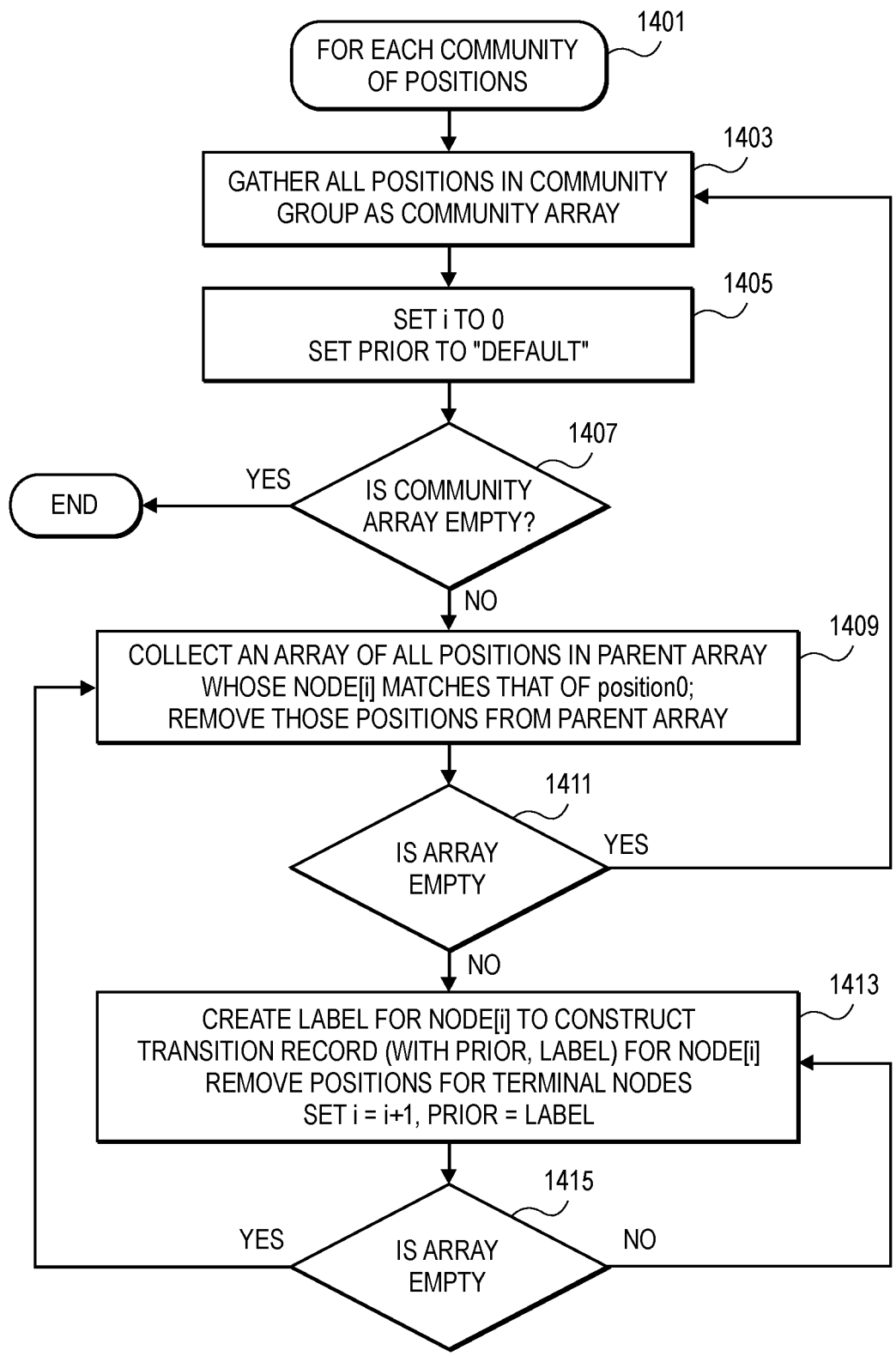
FIG. 14 is a flowchart of one embodiment of the label creation process.

FIG. 14 is a flowchart of one embodiment of the label creation process. As described above, this is a breadth-first matching process for each community (Block 1401). The first step is to gather all partial positions in a community into an array (Block 1403). Then an iteration index, i, is set to zero (Block 1405), and the current label is set to a default value, "default". If the community array is empty—not during this initial step, but in a subsequent iteration—processing is complete (Block 1407). If not, the process starts gathering subarrays, extracting an array which matches the node at the current index of the first position in the parent array (Block 1409). If all elements have been extracted (Block 1411), assign a transition record to the node with prior value set to the current label and indicate the function value assigned to that record. continue with gathering the next array from the community array. Otherwise, the process labels the $i^{th}$ node, and increments i (Block 1413). Labeling involves creating a new string, associating that string with a unique integer value, creating a transition record with prior value set to the current label and current value set to the string. Once transition records have been created and added to the node's transition records, the current label is set to the string value. Continue gathering subarrays.

Figure 15A:
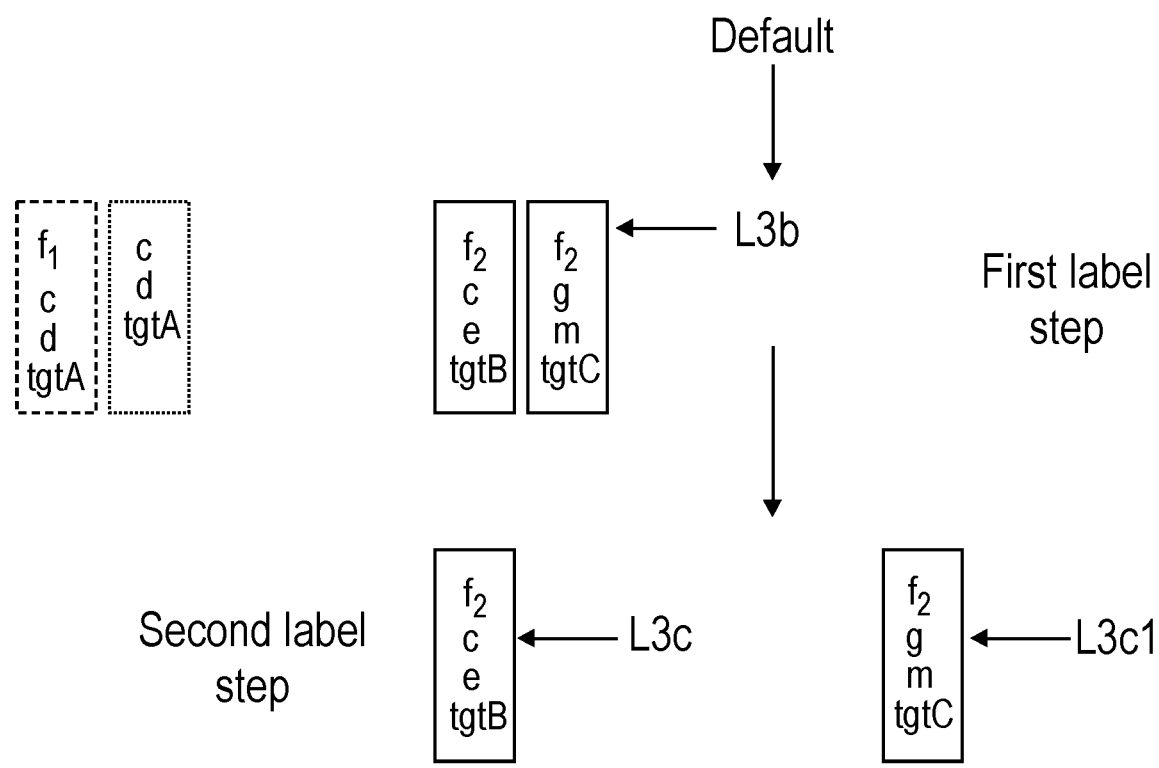
FIG. 15A is a diagram of an example of the breadth-first process for creating labels and transition records in particular a partial labeling process is shown.
Figure 15B:
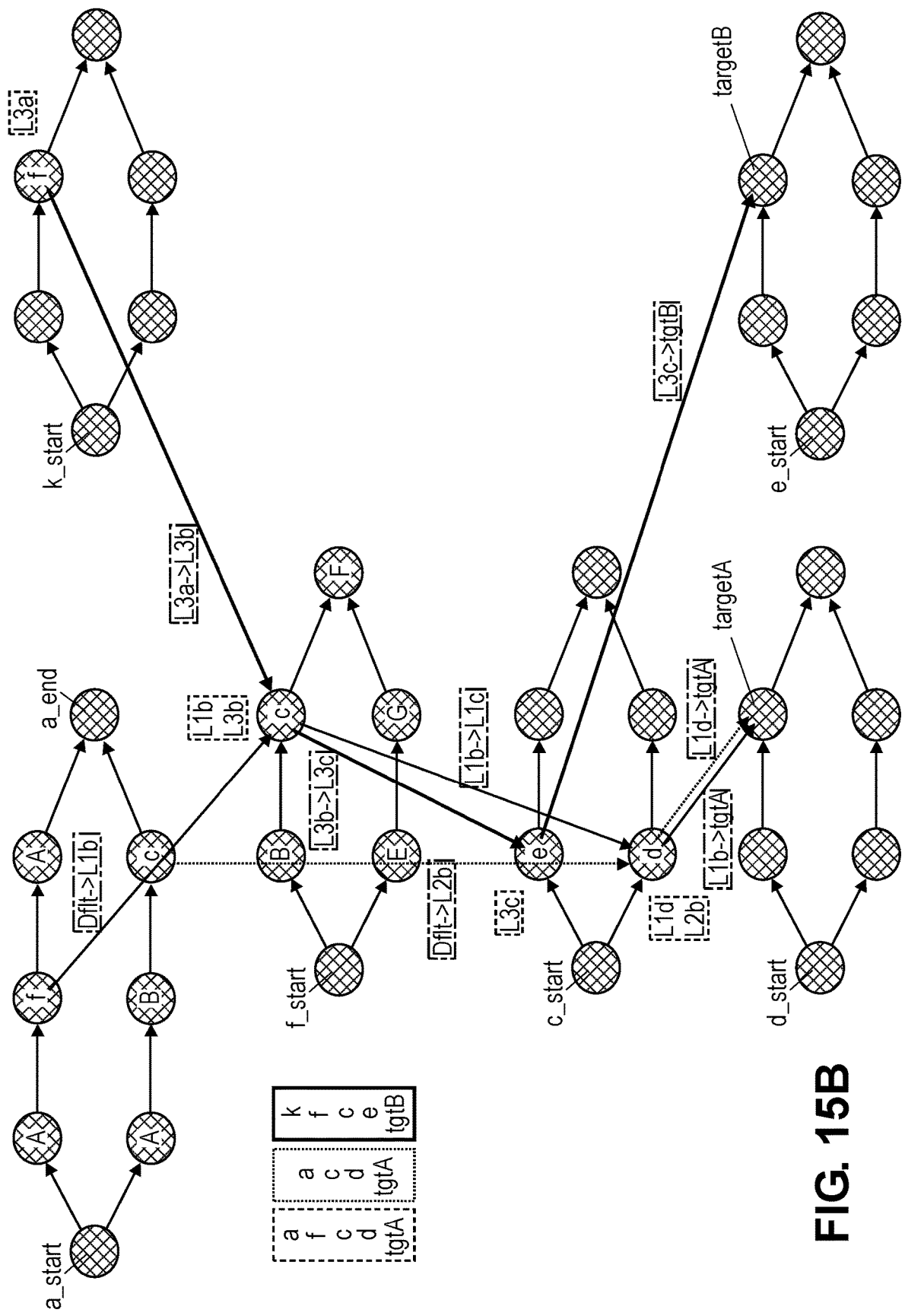
FIG. 15B is a diagram of the example of the breadth-first process including results of the partial labeling process as a part of a larger graph.

FIG. 15A is a diagram of an example of a breadth first process for creating labels and transition records. In particular, the diagram of FIG. 15A shows a partial labeling process. FIG. 15B is a further diagram of the example breadth first process for creating labels and transition records that includes the results of that partial labeling as part of a larger graph. The partial labeling (as shown in FIG. 15A) starts with collecting the partial positions that begin with k (not shown in FIG. 15A) and continue with $f_1$, a NEST node that references f L3a is created and assigned to the "k" node as the transition label from Default (abbreviated to Dflt in FIG. 15B). The label L3b is then created and assigned to the $f_1$ node, and the transition from L3a to L3b is noted. Labeling then continues with the next node in each of the collected partial positions. All partial positions that begin ($f_1$, c) are collected and the L3c label is assigned to c, creating the transition from L3b→L3c. After labeling for these partial positions is completed, all partial positions beginning with ($f_1$, g) are collected and labeled. These lead to the L3 labelings and transitions shown in FIG. 15B.

Label Propagation

Figure 16:
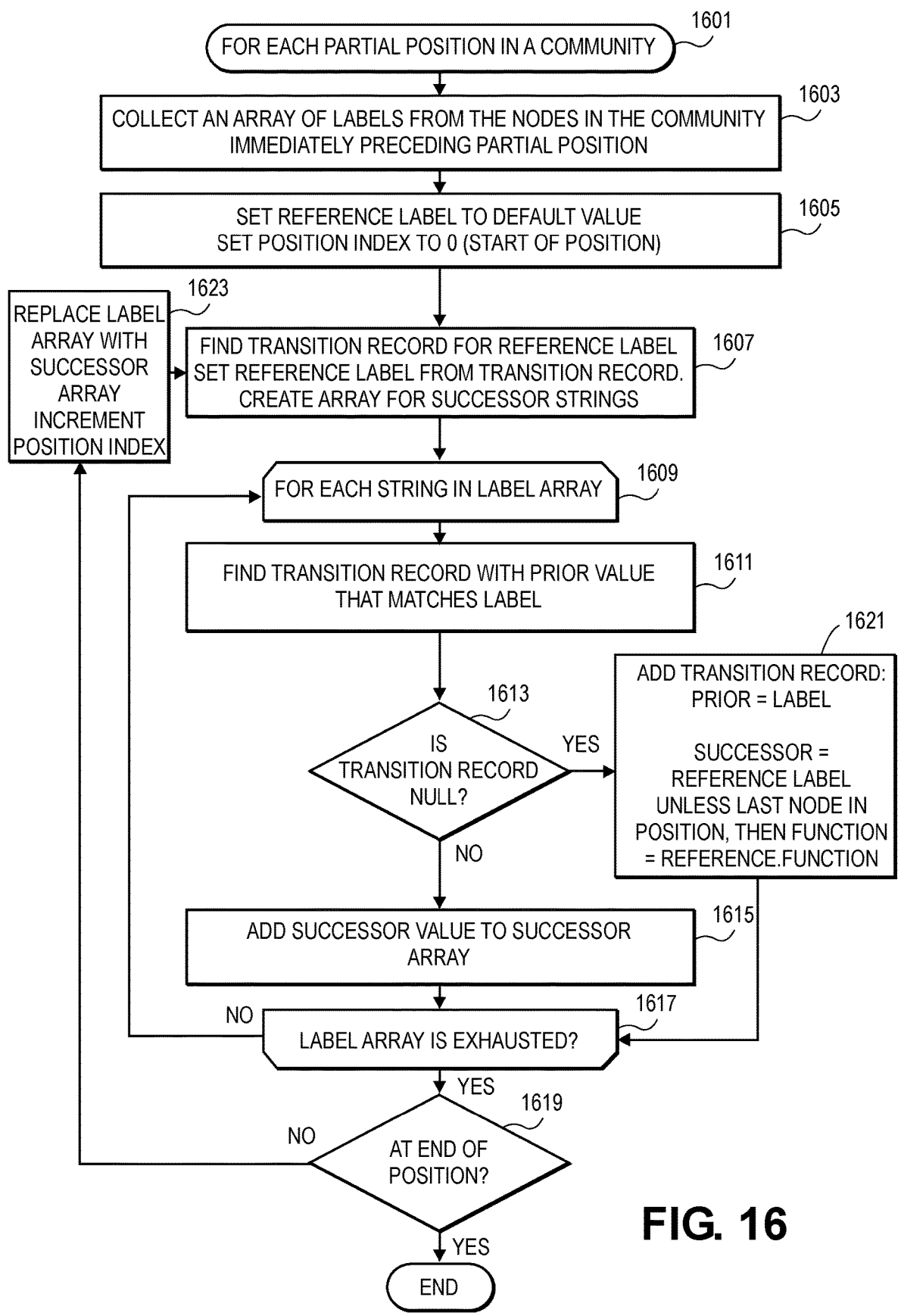
FIG. 16 is a flowchart of one embodiment of a label propagation process.

FIG. 16 is a flowchart of one embodiment of a process to propagate labels. This process propagates labels to handle transitions not addressed in preceding steps of the overall processing. The last operation of the flowchart is for each community to propagate labels as shown in FIG. 14. Within a community, the paths described by position objects may overlap, so the initial labeling does not describe all possible transitions. Label propagation extends transition labeling to cover all transitions. Consider the positions {a, b, c, d, e, F} and {c, d, g, H}. In the second position, c does not have default labeling when prefixed by {a, b}. In this case, the label sequence begun for {a, b} is followed through to d, then a transition from d to g is added that aligns the label sequences for {g, H} to match those for {c, d, g, H} when not prefixed by {a, b}.

Label propagation is done on a partial position by partial position basis within each community. The label propagation process constructs a finite-state automaton for each community in order to be able to track context in subsequent intermediate representations or in the generated runtime code. Starting with a partial position (Block 1601), the process collects an array of labels from the nodes immediately preceding the partial position in the community (Block 1603). Then a position index (current offset into position list) is initialized to 0 (Block 1605) and the process sets a reference label variable to a default value, such as "default." Then processing for that position index begins (Block 1607) by creating a successor array (Block 1607) and identifying a transition record whose prior value matches the reference label. The process also sets the reference label to the label value from that transition record. Then for each string in the label array (Block 1609), the process finds a transition record for the node at that index whose prior field matches that string (Block 1611). The process tests whether that record is null (Block 1613). If the record is null, the process creates a transition record that transitions from the string to the reference label or function from the reference transition record (Block 1621). The process merges the path from the string into a pre-existing path created for an overlapping partial position. If the record is not null, then the process adds the label from the found transition record to the successor array (Block 1615). Then the process tests whether to proceed to the next label in the label array (Block 1617) and continues (Block 1609), or whether all labels in the label array have been processed and tested whether the position index is at the end of the partial position; if so, processing of that partial position has completed. If the position is not at the end of the index, the process replaces (Block 1623) the label array with the successor array and continues (Block 1607).

Figure 17:
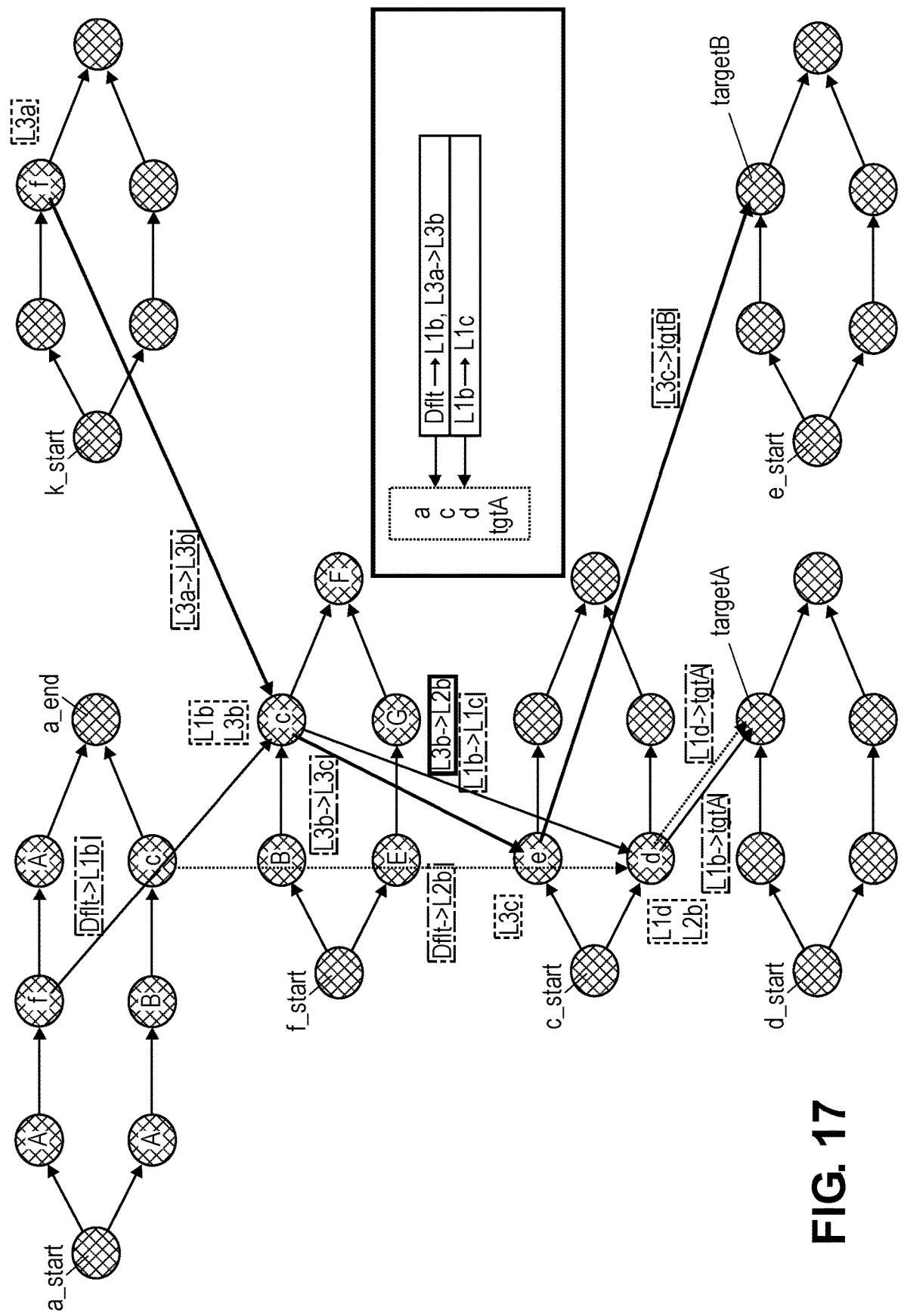
FIG. 17 is a diagram of an example of label propagation.

FIG. 17 is a diagram illustrating an example of label propagation. In the example of FIG. 17, the process propagates the L3 labels from FIGS. 15A and 15B. The overall graph, labels and example are a continuation of that illustrated in FIGS. 15A and 15B. In FIG. 17, the inset shows the partial position being operated on and two of the transitions sets associated with individual nodes. The Default case for "a" transitions to L1b and then L1b transitions to L1c for "d." The L3a→L3b transition, on the other hand, does not have a "d" transition and must therefore merge into the Default series of transitions. Thus, a transition is added that transitions L1b to L1c and ensures that the proper tgtA function is invoked when the {k, f, c, d, tgtA} is reached.

Gathering Positions for Analysis

The point of labeling is that individual nodes become associated with data structures from which code is generated. Each such data structure is associated with a single node, but when those data structures depend on the context in which they appear, then it is necessary to determine context at run time to select the appropriate action. So: for each node to which data structures are attached, an array of {position, data} elements are associated that are added to each time that node is encountered.

It is not sufficient to gather positions in most cases: to limit the number of labels, positions need to be trimmed to remove prefix nodes ({a, b, c, d, e}, for example, might be trimmed to {d, e}) to shrink positions to cover only required context. How positions are trimmed depends on the specific problem. Three specific problems related to this aspect of labeling are described below.

Recursion Labeling

Recursive positions need to be labeled for computing recursion indices and for resetting transition indices when propagating other labeling.

Instead of trimming, recursive positions are determined relative to a primary—recursive—subroutine. Instead of starting with the "start" subgraph, each primary subroutine is walked to find recursion points. In some cases, more than one member of a recursion chain occurs as a primary subroutine; all positions derived from a recursion chain will end up belonging to the same community.

Breadth-first pattern matching for Linear GLL recognizer generation

A path that begins {a, b, c, d, e} and terminates at {a, b, g, h, k} has local context {c, d, e}—both begin and end are localized to the prefix position {a, b}, and the position of interest is the begin position. In practice, there will be multiple end positions, so the trimming algorithm is to find the shortest prefix.

Variable Assignment Tracking

Static single assignment form logically replaces variables that are assigned at multiple points in a program with variables which are assigned only once, but it may also be interesting to look at variable references versus assignments. Variable assignment position and variable reference position provide bounds for labeling, although the utility of such labeling is unclear.

Path Walks and Breadth-First Pattern Matching

The core of the labeling algorithm described above is a good example of breadth-first pattern matching. Somewhat more machinery is required for path walks in a subroutine graph in comparison to path walking an entire graph. Position information is required for the path walking process, as are stacks to save and restore recursion jump positions. Recursion label tracking is also desirable. These features can be gathered into "coordinates" objects to be used for navigating path walks. Coordinates are used for single-stepping a path walk.

FIG. 18 is a diagram of example paths that can be encountered during a path walk process. FIG. 18 shows an example path walk from the recursion example from FIG. 3. Starting the path with the "A" node in the first subroutine graph, a step is taken to reach the "f" (NEST) node, and after nesting the path walk process comes to the FORK in f (i.e., the first node in the second subroutine graph) and position {f, FORK}. Selecting the upper alternative and stepping brings the process to {f, D}. Another step reaches {f, g}, which nests to {f, g, FORK}. Again, selecting the upper path and advancing, the process reaches {f, g, E}, followed by {f, g, f/PUSH}. Recursion returns to an {f, FORK} position, but with {f, g, G} pushed onto the stack (later popped at a POP_CONTEXT node). From here, the path walk would continue until the path walk completes through all of the recursions and the associated stack manipulation to pop all of the related context.

Figure 19:
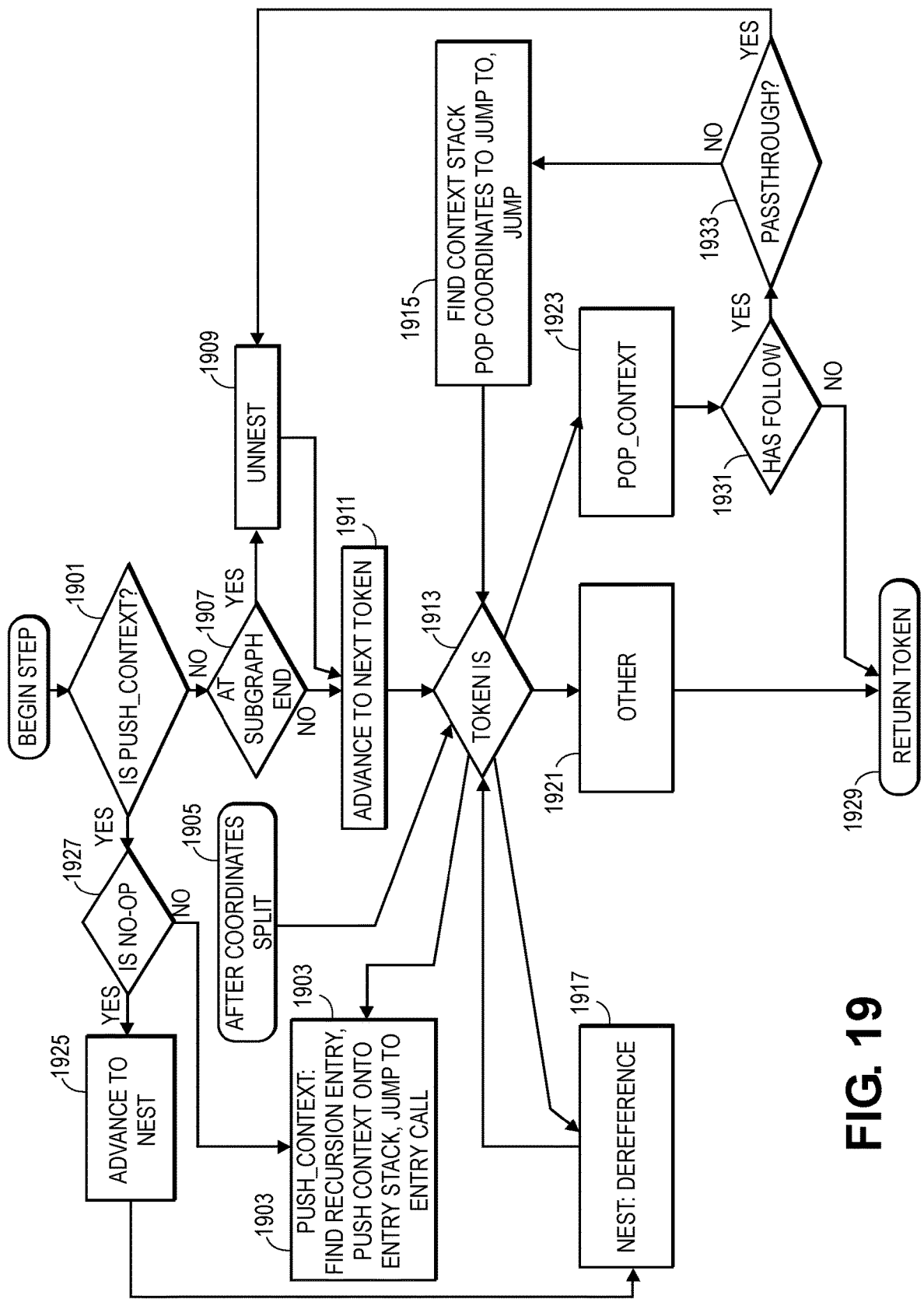
FIG. 19 is a flowchart of one embodiment of a path walking process.

FIG. 19 is a flowchart of one embodiment single-step actions for path walking a set of subroutine graphs. There are three unusual entry conditions in walking these subroutine graphs: for a normal entry, the exceptions are that either the current node is a PUSH_CONTEXT node (Block 1901), in which case the current coordinates are pushed onto the appropriate stack (Block 1903). If the current node is not a PUSH-CONTEXT node, then the process determines if the current node is the end of a subgraph (Block 1907) in which case an unnest operation is performed (Block 1909).

The process can then advance to the next node (Block 1911). Alternatively, if the current node token follows a decision point and coordinate split, then the process may enter here (Block 1905). The process examines the current node and takes one of a set of possible actions (Block 1913). If the node is a NEST node, then the process dereferences (Block 1917) and re-evaluates (Block 1913). Each dereference of a NEST node pushes the NEST node and its associated subroutine record and sets the current node to the start of the graph referenced by the associated subroutine record; every dereference is eventually followed by an unnest which pops the node and record stacks and sets the current node to the node following the NEST node. If the node is a POP_CONTEXT node (Block 1923), then the process checks if there is a follow context (Block 931). This happens if the POP_CONTEXT is not relevant (i.e., is a passthrough—Block 'K33) and is stepped past to an unnest, or if the appropriate context stack has a set of coordinates to jump to. If there is no follow, then the process returns the POP_CONTEXT token (Block 1929) so the caller can take an appropriate action. If the next token is neither NEST nor POP_CONTEXT (Block 1921), then the process returns that token (Block 1929).

If the token returned is a decision node—that is, it has multiple nodes after or has loopbacks, then program intervention may be utilized to continue the walk because the path forks. On the other hand, path walks tend to take place as part of a breadth-first pattern match, and paths will need to be split by token type in any case. This is the source of the alternative start after coordinates split.

Figure 20:
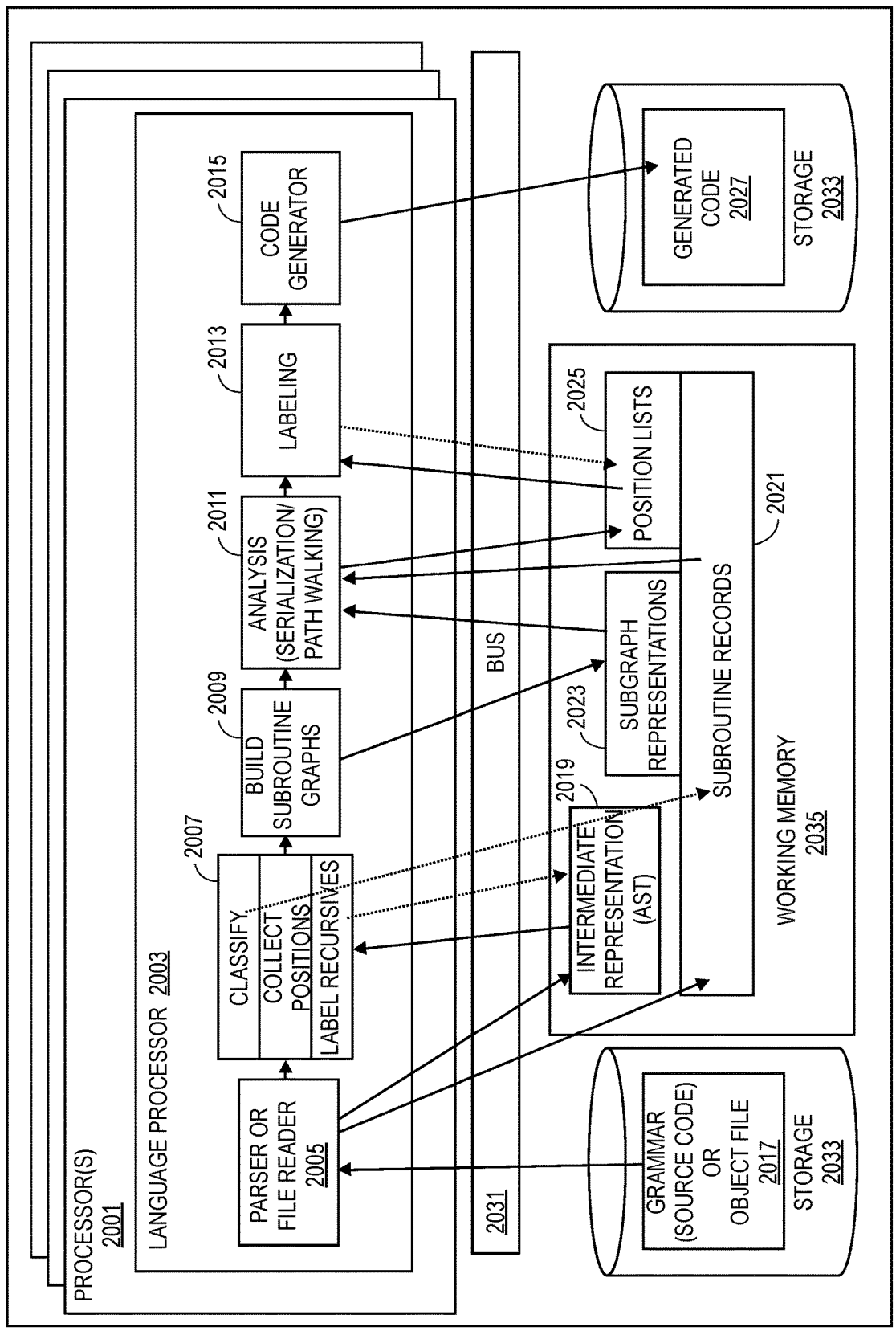
FIG. 20 is a diagram of one embodiment of the parsing system.

FIG. 20 is a diagram of one embodiment of a computer system implementing a language processor (which might be a compiler or language translator or linker). The computer system can include a processor 2001 or set of processors to execute a language processor generator 2003 implementing the parsing processes described herein. In another embodiment, the language processor 2003 and associated processes can be executed in a distributed manner across multiple computer systems in communication with one another. For sake of clarity, an embodiment executed within a single computer system is described herein below. However, one skilled in the art would understand that the principles and structures described herein are consistent with other embodiments having other configurations such as distributed implementations.

In one embodiment, the language processor 2003 includes a parser or file reader 2005 front end for processing an input grammar to an intermediate representation such as an AST, pre-graph construction operations 2007 to construct subroutine records, and carry out recursion analysis to fill out record contents and add recursion labeling to tokens, subroutine graph construction 2009, analysis using the subroutine graph IR 2011, post-analysis token labeling 2013, and terminal processing including code generation 2015 to create the runtime language processing code. The front-end parser or file reader 2005 takes the source code or object file 2017 as an input and generates the intermediate representation (AST) 2019 and creates a table for subroutine graph records 2021 as set forth above. Pre-subroutine graph construction processing 2007 takes the intermediate representation 2019 as input to record information for the subroutine records 2021. Subroutine graph construction 2009 produces the subroutine graphs 2023 that are associated with subroutine records. Analysis 2011 produces position lists that are used as input for labeling 2013.

The grammar or object code 2017 and final generated code 2027 can be located in storage (disk) 2033 of the computer system and are accessible to the language processor 2003 over a bus 2013 or similar interconnect. The intermediate representation 2019, subroutine records 2021, subroutine graphs 2023, and position list 2025 can be located in the working memory of the computer system and are accessible to the language processor 2003 over a bus 2013 or similar interconnect. The processors 2001 can communicate over a bus 2031, chip-level or system area network, or similar communication system with a working memory 2035 and storage 2033 storing the source code 2015, intermediate representation 2015, graph representation 2017 and generated parser 2019. The working memory 2021 can be any type of storage device such as solid-state random-access memory. The working memory 2021 can store any of the above-mentioned data structures in addition to storing compiled code, the working memory 2021 and persistent storage devices (not shown) are responsible for storing the executable of the compilers and parsers and their subcomponents.

The working memory 2035 can be in communication with the processors 2001 over the bus 2031. However, one skilled in the art would understand that the bus 2031 does not strictly indicate that only a bus separates the processors 2001 and the bus 2031 can include intermediate hardware, firmware and software components that implement the communication between the processor 2001 and the language processor 2003. One skilled in the art would understand that the computer system is provided by way of example and not limitation and that well-known structures and components of a computer system have been omitted for sake of clarity.

Figure 21:
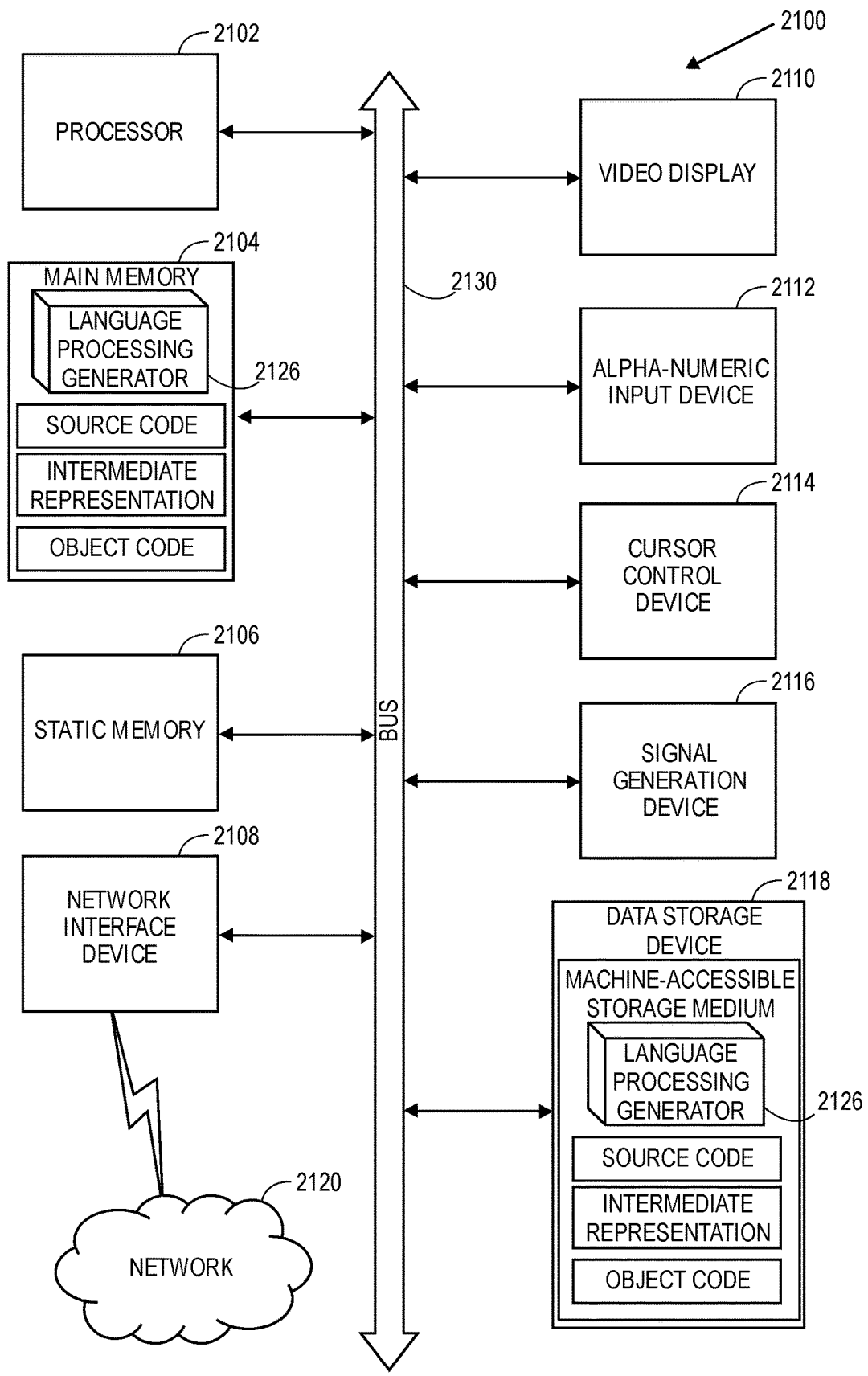
FIG. 21 is a diagram of one embodiment of a computer system implementing the parsing process.

FIG. 21 illustrates a diagrammatic representation of a machine in the exemplary form of a computer system within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system includes a processing device 2102, a main memory 2104 (e.g., read-only memory (ROM), flash memory, dynamic random access memory (DRAM) such as synchronous DRAM (SDRAM) or Rambus DRAM (RDRAM), etc.), a static memory 2106 (e.g., flash memory, static random access memory (SRAM), etc.), and a secondary memory 2118 (e.g., a data storage device), which communicate with each other via a bus.

The processing device 2102 represents one or more general-purpose processing devices such as a microprocessor, central processing unit, or the like. More particularly, the processing device may be a complex instruction set computing (CISC) microprocessor, reduced instruction set computing (RISC) microprocessor, very long instruction word (VLIW) microprocessor, processor implementing other instruction sets, or processors implementing a combination of instruction sets. The processing device 2102 may also be one or more special-purpose processing devices such as an application specific integrated circuit (ASIC), a field programmable gate array (FPGA), a digital signal processor (DSP), network processor, or the like. The processing device 2102 is configured to execute a compiler including a language processor generator 2126 and/or related components for performing the operations and steps discussed herein.

The computer system 2100 may further include a network interface device 2108. The computer system also may include a video display unit 2110 (e.g., a liquid crystal display (LCD) or a cathode ray tube (CRT)), an alphanumeric input device 2112 (e.g., a keyboard), a cursor control device 2114 (e.g., a mouse), and a signal generation device 2116 (e.g., a speaker).

The secondary memory 2118 may include a machine-readable storage medium 2128 (or more specifically a non-transitory computer readable storage medium) on which is stored one or more sets of instructions (e.g., the parser and/or language processor generator 2126) embodying any one or more of the methodologies or functions described herein (e.g., the language processor generator 2126). The language processor generator 2126 (i.e., implementing the method described in this document) may also reside, completely or at least partially, within the main memory 2104 and/or within the processing device 2102 during execution thereof by the computer system 2100; the main memory 2104 and the processing device also constituting machine-readable storage media. The language processor generator 2126 may further be transmitted or received over a network via the network interface device 2108.

The machine-readable storage medium 2128, which may be a non-transitory computer readable storage medium, may also be used to store the language processor generator 2126 module persistently. While the non-transitory computer readable storage medium is shown in an exemplary embodiment to be a single medium, the term "non-transitory computer readable storage medium" should be taken to include a single medium or multiple medium (e.g., a centralized or distributed database, and/or associated caches and servers) that store the one or more sets of instructions. The term "non-transitory computer readable storage medium" shall also be taken to include any medium that is capable of storing or encoding a set of instructions for execution by the machine that causes the machine to perform any one or more of the methodologies of the present invention. The term "non-transitory computer readable storage medium" shall accordingly be taken to include, but not be limited to, solid-state memories, and optical and magnetic media.

The computer system 2100 may additionally include the language processor generator 2126 for implementing the functionalities of the compilation process described above. The module, components and other features described herein can be implemented as discrete hardware components or integrated in the functionality of hardware components such as ASICS, FPGAs, DSPs or similar devices. In addition, the module can be implemented as firmware or functional circuitry within hardware devices. Further, the module can be implemented in any combination of hardware devices and software components.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "executing," "determining," "setting," "converting," "constructing," "traversing" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes, or it may comprise a general-purpose computer system selectively programmed by a computer program stored in the computer system. Such a computer program may be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method for labeling a plurality of subroutine calling histories to reach a plurality of nodes discovered from a depth-first traversal of a subroutine-structured graph used as an intermediate representation during formal language processing implemented by a computing device, the method comprising:

recording, by the computing device, each of the plurality of subroutine calling histories as a position list of calling nodes leading to a corresponding end node from the plurality of nodes;

trimming, by the computing device, at least one leading node in the plurality of subroutine calling histories leading to at least one end node in the plurality of nodes to determine a common relative calling history as a position list leading to one or more end nodes in the plurality of nodes;

identifying, by the computing device, communities of overlapping position lists from the plurality of subroutine calling histories where each of the communities is independently labeled;

assigning, by the computing device, labels to the plurality of nodes through a breadth-first traversal of each position list of the plurality of subroutine calling histories that have common start nodes; and propagating, by the computing device, labels in the communities of overlapping position lists where there is a transition from a labeling sequence for one position list into a labeling sequence for an overlapped position list such that all label sequences through each position list of the plurality of subroutine calling histories lead to an end of the overlapped position list.

2. The method of claim 1, further comprising:

generating a subsequent intermediate representation by conversion of the plurality of nodes and sequential relationships from the communities of overlapping position lists, including a loopback from a last node to a first node of each overlapping position list, into graph form, where the graph form enables identification of the communities from the plurality of nodes and position lists.

3. The method of claim 1, further comprising:

creating labels for denoting state and state transitions during breadth-first navigation through the position lists, where state transition records are associated with tokens and subsequently referenced for code generation, where for each position list, there is a first transition record for a first token that specifies a default prior, with a corresponding second transition record from label to function for a last token.

4. The method of claim 1, wherein propagating the labels reconciles label sequences within each position list to align with a label sequence beginning with a default state, where, beginning with transition records associated with a first token in a position list, label transitions are followed from token to token, where when a token has no associated transition record for a prior label, one is created that transitions from that prior label to a corresponding label for that token from a default label sequence.

5. A non-transitory computer-readable storage medium having stored therein a set of instructions which when executed by a computing device cause the computing device to perform a set of operations to implement a method for labeling a plurality of subroutine calling histories to reach a plurality of nodes discovered from a depth-first traversal of a subroutine-structured graph used as an intermediate representation during formal language processing, the set of operations comprising:

recording each of the plurality of subroutine calling histories as a position list of calling nodes leading to a corresponding end node from the plurality of nodes;

trimming at least one leading node in the plurality of subroutine calling histories leading to at least one end node in the plurality of nodes to determine a common relative calling history as a position list leading to one or more end nodes in the plurality of nodes;

identifying communities of overlapping position lists from the plurality of subroutine calling histories where each of the communities is independently labeled;

assigning labels to the plurality of nodes through a breadth-first traversal of each position list of the plurality of subroutine calling histories that have common start nodes; and propagating labels in the communities of overlapping position lists where there is a transition from a labeling sequence for one position list into a labeling sequence for an overlapped position list such that all label sequences through each position list of the plurality of subroutine calling histories lead to an end of the overlapped position list.

6. The non-transitory computer-readable storage medium of claim 5, wherein the set of operations further comprise:

generating a subsequent intermediate representation by conversion of the plurality of nodes and sequential relationships from the communities of overlapping position lists, including a loopback from a last node to a first node of each overlapping position list, into graph form, where the graph form enables identification of the communities from the plurality of nodes and position lists.

7. The non-transitory computer-readable storage medium of claim 5, further comprising:

creating labels for denoting state and state transitions during breadth-first navigation through the position lists, where state transition records are associated with tokens and subsequently referenced for code generation, where for each position list, there is a first transition record for a first token that specifies a default prior, with a corresponding second transition record from label to function for a last token.

8. The non-transitory computer-readable storage medium of claim 5, wherein propagating the labels reconciles label sequences within each position list to align with a label sequence beginning with a default state, where, beginning with transition records associated with a first token in a position list, label transitions are followed from token to token, where when a token has no associated transition record for a prior label, one is created that transitions from that prior label to a corresponding label for that token from a default label sequence.

9. A computing system to process subroutine-structured graph-based intermediate representations during formal language processing, the computing system comprising:

a non-transitory computer-readable medium having stored therein a language processor generator; and a processor in communication with the non-transitory computer-readable medium, the processor to execute the language processor generator, the language processor generator to, record each of a plurality of subroutine calling histories as a position list of calling nodes leading to a corresponding end node from a plurality of nodes, trim at least one leading node in the plurality of subroutine calling histories leading to at least one end node in the plurality of nodes to determine a common relative calling history as a position list leading to one or more end nodes in the plurality of nodes, identify communities of overlapping position lists from the plurality of subroutine calling histories where each of the communities is independently labeled, assign labels to the plurality of nodes through a breadth-first traversal of each position list of the plurality of subroutine calling histories that have common start nodes, and propagate labels in the communities of overlapping position lists where there is a transition from a labeling sequence for one position list into a labeling sequence for an overlapped position list such that all label sequences through each position list of the plurality of subroutine calling histories lead to an end of the overlapped position list.

10. The computing system of claim 9, wherein the language processor generator is further to generate a subsequent intermediate representation by conversion of the plurality of nodes and sequential relationships from the communities of overlapping position lists, including a loop-back from a last node to a first node of each overlapping position list, into graph form, where the graph form enables identification of the communities from the plurality of nodes and position lists.

11. The computing system of claim 9, wherein the language processor generator is further to create labels for denoting state and state transitions during breadth-first navigation through the position lists, where state transition records are associated with tokens and subsequently referenced for code generation, where for each position list, there is a first transition record for a first token that specifies a default prior, with a corresponding second transition record from label to function for a last token.

12. The computing system of claim 9, wherein propagating the labels reconciles label sequences within each position list to align with a label sequence beginning with a default state, where, beginning with transition records associated with a first token in a position list, label transitions are followed from token to token, where when a token has no associated transition record for a prior label, one is created that transitions from that prior label to a corresponding label for that token from a default label sequence.

13. The method of claim 1, wherein the communities are a maximal set of nodes in a graph for which given any two nodes in the maximal set of nodes there is a path between the two nodes.

14. The method of claim 1, wherein creating of labeling includes attaching a transition record to a node or token that includes a prior label, a current label for non-terminal nodes or tokens, and a function value for terminal nodes or tokens.

15. The method of claim 1, wherein creating of labeling enables state machines in generated code to select from context-dependent actions.

16. The non-transitory computer-readable storage medium of claim 5, wherein communities are a maximal set of nodes in a graph for which given any two nodes in the maximal set of nodes there is a path between the two nodes.

17. The non-transitory computer-readable storage medium of claim 5, wherein creating of labeling includes attaching a transition record to a node or token that includes a prior label, a current label for non-terminal nodes or tokens, and a function value for terminal nodes or tokens.

18. The non-transitory computer-readable storage medium of claim 5, wherein creating of labeling enables state machines in generated code to select from context-dependent actions.

19. The computing system of claim 9, wherein communities are a maximal set of nodes in a graph for which given any two nodes in the maximal set of nodes there is a path between the two nodes.

20. The computing system of claim 9, wherein creating of labeling includes attaching a transition record to a node or token that includes a prior label, a current label for non-terminal nodes or tokens, and a function value for terminal nodes or tokens.

21. The computing system of claim 9, wherein creating of labeling enables state machines in generated code to select from context-dependent actions.

* * * * *